US012458559B2

(12) United States Patent
Fleming

(10) Patent No.: US 12,458,559 B2
(45) Date of Patent: Nov. 4, 2025

(54) THERAPEUTIC DEVICE FOR TREATMENT OF HEADACHE AND PAIN

(71) Applicant: David S. Fleming, Boca Raton, FL (US)

(72) Inventor: David S. Fleming, Boca Raton, FL (US)

( * ) Notice: Subject to any disclaimer, the term of this patent is extended or adjusted under 35 U.S.C. 154(b) by 0 days.

(21) Appl. No.: 18/643,951

(22) Filed: Apr. 23, 2024

(65) Prior Publication Data

US 2024/0325233 A1 Oct. 3, 2024

Related U.S. Application Data

(63) Continuation of application No. 16/931,650, filed on Jul. 17, 2020, now abandoned, which is a (Continued)

(51) Int. Cl.

*A61H 7/00* (2006.01)
*A47G 9/10* (2006.01)
*A61G 7/07* (2006.01)

(52) U.S. Cl.

CPC ........... *A61H 7/001* (2013.01); *A47G 9/1081* (2013.01); *A61G 7/072* (2013.01); *A61H 2201/0192* (2013.01); *A61H 2201/1284* (2013.01); *A61H 2201/1602* (2013.01); *A61H 2201/1609* (2013.01); *A61H 2201/1685* (2013.01)

(58) Field of Classification Search

CPC ...... A47G 9/1081; A47G 9/10; A47G 9/1009; A47G 2009/1018; A47G 9/1045; A47G 9/109; A61G 7/072; A61H 7/001; A61H 1/008; A61H 1/006; A61H 2201/0192; A61H 2201/1284; A61H 2201/1602; A61H 2201/1609; A61H 2201/1685; A61H 1/00; A61H 1/005; A61H 1/0296; A61H 15/00; A61H 2201/1676; A61H 39/04; A63B 21/00047; A63B 21/4003; A63B 23/0238; A63B 23/025; A63B 21/4047–4049

USPC ...... 128/102.1; 482/10; 601/32, 38–39, 115, 601/118

See application file for complete search history.

(56) References Cited

U.S. PATENT DOCUMENTS 1,265,083 A 5/1918 Hoard
D82,677 S 12/1930 Heyer
(Continued)

OTHER PUBLICATIONS

Rolyan® Occipital Base Release Board, 1987, Revised 1/90, 1/12, 2 pages, Patterson Medical Products, Inc.
(Continued)

*Primary Examiner* — Rachel T Sippel

(74) *Attorney, Agent, or Firm* — Pillsbury Winthrop Shaw Pittman, LLP

(57) ABSTRACT

A therapeutic device and method for using the same. The therapeutic device has a supportive body and a pressure applicator extending from the body that is configured to apply pressure to suboccipital muscles of a patient. The pressure applicator may be altered to adjust a position and points through which to apply pressure to the suboccipital muscles. The body may be positioned at an angle relative to the patient's neck and the pressure applicator is applied to the suboccipital muscles. The pressure can be applied for a duration of time to relieve and/or prevent headaches and migraines in patients.

18 Claims, 37 Drawing Sheets

Related U.S. Application Data continuation of application No. 15/678,532, filed on Aug. 16, 2017, now Pat. No. 10,765,589.

(60) Provisional application No. 62/489,835, filed on Apr. 25, 2017, provisional application No. 62/375,653, filed on Aug. 16, 2016.

(56) References Cited

U.S. PATENT DOCUMENTS

| | | | | |
|---|---|---|---|---|
| 2,452,816 | A * | 11/1948 | Wagner | A61G 13/12 5/636 |
| 2,836,175 | A | 5/1958 | Takeo | |
| 3,026,624 | A | 3/1962 | Clay | |
| 3,625,204 | A | 12/1971 | Sekiguchi | |
| 3,645,257 | A | 2/1972 | Nakayam | |
| 3,672,355 | A | 6/1972 | Ogawa et al. | |
| 3,831,592 | A | 8/1974 | Lancellotti | |
| 4,210,134 | A | 7/1980 | Okazaki et al. | |
| 4,233,966 | A | 11/1980 | Takahashi | |
| 4,406,451 | A | 9/1983 | Gaetano | |
| 4,479,495 | A | 10/1984 | Isaacson | |
| 4,509,521 | A | 4/1985 | Barry | |
| 4,771,493 | A * | 9/1988 | Park | A47G 9/1009 5/643 |
| 4,832,006 | A | 5/1989 | Kirsch | |
| 4,944,289 | A | 7/1990 | Matthews | |
| 5,080,090 | A | 1/1992 | Liau et al. | |
| 5,131,410 | A * | 7/1992 | Neill | A61G 7/07 606/240 |
| D353,008 | S | 11/1994 | Van Ham | |
| 5,405,311 | A | 4/1995 | Pecora et al. | |
| D359,358 | S | 6/1995 | Pecora | |
| 5,491,855 | A | 2/1996 | Charles | |
| 5,569,175 | A | 10/1996 | Chitwoord | |
| 5,765,921 | A | 6/1998 | Chuang | |
| 5,792,174 | A | 8/1998 | Ioan | |
| 5,820,573 | A | 10/1998 | Ramos | |
| 5,843,005 | A | 12/1998 | Chubinsky | |
| 5,899,868 | A | 5/1999 | VandeBerg | |
| 5,913,839 | A | 6/1999 | Wincek | |
| 5,935,090 | A | 8/1999 | Kennon | |
| D413,985 | S | 9/1999 | Martin et al. | |
| 6,013,042 | A | 1/2000 | Sakai | |
| 6,065,807 | A | 5/2000 | Going et al. | |
| 6,113,563 | A | 9/2000 | D'Amico et al. | |
| 6,182,313 | B1 | 2/2001 | Eschenbach | |
| 6,217,121 | B1 | 4/2001 | Mollet | |
| 6,315,743 | B1 | 11/2001 | Guest | |
| D463,029 | S | 9/2002 | Collins | |
| 6,632,187 | B2 | 10/2003 | Bal | |
| 6,718,581 | B2 | 4/2004 | Riach | |
| D492,037 | S | 6/2004 | Chien | |
| 6,821,260 | B2 | 11/2004 | Fors | |
| 6,945,986 | B2 | 9/2005 | Lope | |
| 7,320,668 | B1 | 1/2008 | Warder | |
| 7,458,945 | B2 | 12/2008 | Zermont | |
| D586,470 | S | 2/2009 | Warder | |
| 7,563,235 | B2 | 7/2009 | van der Meer | |
| 7,662,088 | B2 * | 2/2010 | McCaffrey | A61H 19/44 600/38 |
| 7,732,966 | B2 | 6/2010 | Sivasubramaniam | |
| 7,998,099 | B2 | 8/2011 | Tull et al. | |
| D646,793 | S | 10/2011 | Wagner | |
| D673,284 | S | 12/2012 | Lowsky | |
| D694,898 | S | 12/2013 | Chen | |
| D698,934 | S | 2/2014 | Manseau | |
| D701,613 | S | 3/2014 | Twiggs | |
| D711,009 | S | 8/2014 | Wong | |
| 8,808,208 | B2 | 8/2014 | Mouatt | |
| D719,664 | S | 12/2014 | Riftin et al. | |
| D726,840 | S | 4/2015 | Lorelli | |
| 9,027,184 | B2 * | 5/2015 | Cohen | A61F 5/00 5/639 |
| 9,032,961 | B2 | 5/2015 | Zhang | |
| 9,402,759 | B2 | 8/2016 | Bonutti et al. | |
| 9,649,246 | B1 | 5/2017 | Johnson | |
| D788,933 | S | 6/2017 | Sitsihovskiy et al. | |
| 9,687,416 | B2 | 6/2017 | Turner | |
| 9,775,764 | B1 | 10/2017 | Rill | |
| 9,782,317 | B2 | 10/2017 | Mount | |
| D825,770 | S * | 8/2018 | Siemer | D24/211 |
| 10,426,693 | B2 | 10/2019 | Ishikawa et al. | |
| 10,675,215 | B1 * | 6/2020 | Yoon | A61H 1/008 |
| 10,765,589 | B2 | 9/2020 | Fleming | |
| 2002/0049469 | A1 | 4/2002 | Chang | |
| 2005/0187498 | A1 | 8/2005 | Miller | |
| 2006/0241538 | A1 | 10/2006 | Chen | |
| 2007/0000531 | A1 | 1/2007 | Russo | |
| 2007/0089752 | A1 | 4/2007 | Christensen | |
| 2008/0109960 | A1 | 5/2008 | Brown et al. | |
| 2008/0255486 | A1 * | 10/2008 | Ludlow | A61H 7/002 601/169 |
| 2009/0012435 | A1 * | 1/2009 | Masek | A61H 39/04 601/128 |
| 2010/0094183 | A1 | 4/2010 | Golombek | |
| 2012/0329621 | A1 * | 12/2012 | Lorentz, II | A63B 21/4033 482/139 |
| 2015/0110903 | A1 | 4/2015 | Khan et al. | |
| 2015/0328491 | A1 | 11/2015 | Miller et al. | |
| 2016/0022529 | A1 | 1/2016 | Abdo | |
| 2017/0071817 | A1 | 3/2017 | Sanchez | |
| 2018/0303293 | A1 * | 10/2018 | Bence | A47K 7/04 |

OTHER PUBLICATIONS

Hiren, "Most Important Acupressure Points for Headache and Migraine," Acupressure Points Guide, 2014.

Derry, Philip, "Scientists May Have Discovered Whal Causes Migraines and a Path Toward a Cure," Jul. 13, 2016.

* cited by examiner

FULL ROUND

FACETED

SEMI ROUND

HEX ROUND

THERAPEUTIC DEVICE FOR TREATMENT OF HEADACHE AND PAIN

CROSS REFERENCE TO RELATED APPLICATION

The present application is a continuation of U.S. patent application Ser. No. 16/931,650 filed Jul. 17, 2020, which is a continuation of U.S. patent application Ser. No. 15/678,532 filed Aug. 16, 2017, which claims benefit of U.S. Provisional Patent Application No. 62/375,653 filed Aug. 16, 2016, and U.S. provisional patent application 62/489,835, filed on Apr. 25, 2017, all of which are incorporated by reference herein in their entireties.

BACKGROUND

Field

This disclosure is generally related to a therapeutic device. More specifically, the therapeutic device provides pressure to suboccipital muscles to relieve and/or prevent a user of headaches and migraines.

Description of Related Art

Per some estimates, more than approximately 40 million Americans (adults and children) suffer from chronic headaches and/or migraines each year. Generally, doctors and specialists focus on either eliminating common causes of headaches such as dehydration, vitamin deficiency, diet, nutrition, reaction to particular foods, lifestyle, or on treating symptoms of headaches, in an effort to increase comfort when headaches do arise. For example, advice and recommendations for addressing headaches typically includes: being in a quiet place, being in a dark room, lying down, taking a bath or shower, applying a cool wrap or ice pack, applying a heat wrap, and/or taking medication.

Also, some have suggested neck adjustments or massage therapy by a trained professional. Although such adjustments and/or massage therapy by a professional or chiropractor may help at the time of a headache, because most patients are unable to know in advance when a headache will occur, relief at the time of a headache is rare. For example, the difficulty of knowing in advance when to schedule an appointment, the inconvenience of having to drive to an appointment (with the headache), the expense, and the possibility that a clinic and/or massage place may not be open or have an appointment available at the time of the headache each contribute to the difficultly of a patient finding relief.

While a few of the above noted recommendations may have some impact with regards to headaches, some find that relief from a current headache is minimal. Also, the above methods can be inconvenient, time-consuming, and/or expensive. Further, progress in identifying the cause(s) of the headaches is slow. In some cases, despite multiple types of tests, some doctors and specialists are unable to find cause(s) for a patient's headaches.

SUMMARY

It is an aspect of this disclosure to provide a therapeutic device. The therapeutic device includes a body extending in a longitudinal direction configured to provide support to a patient's neck, and a pressure applicator device extending from the body. The pressure applicator device is configured to apply pressure to at least two points on suboccipital muscles of the patient. The pressure applicator device is configured for adjustment such that the at least two points through which pressure is applied to the suboccipital muscles are altered.

Another aspect provides a method of using a therapeutic device, such as the device described above. The method includes: adjusting the pressure applicator device for placement relative to suboccipital points of the patient; positioning the pressure applicator device on the suboccipital muscles of the patient; and applying pressure to the suboccipital muscles using the pressure applicator device for a duration of time.

Other aspects, features, and advantages of the present disclosure will become apparent from the following detailed description, the accompanying drawings, and the appended claims.

DETAILED DESCRIPTION OF THE PREFERRED EMBODIMENT(S)

The device and method of using the device as disclosed herein is designed to provide relief for headaches in a patient, as well as prevent future onset of headaches. The device includes adjustable features to provide a "one-size-fits-all" approach for therapeutic treatment and relief purposes of headaches and other body pains in patients and users. As will become further evident by the description below, the need for a third party or professional to address patients' is substantially eliminated, thus reducing and/or eliminating inconvenience(s), expenses, and lost time associated with traditional headache relief methods. In some instances, the disclosed device and method further allows patients to reduce and/or avoid taking over-the-counter and/or prescribed medication.

Figure 10:
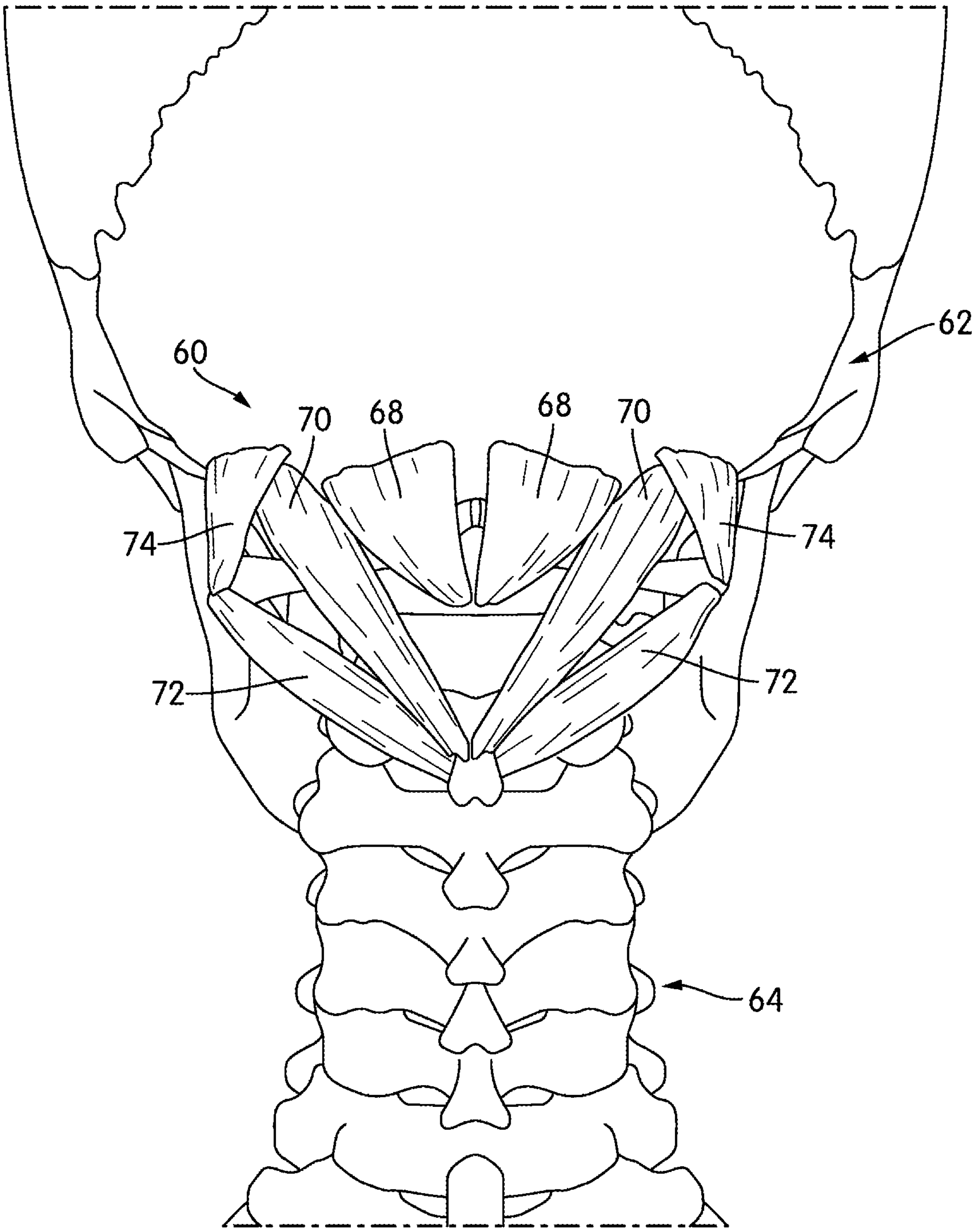
FIG. 10 illustrates suboccipital muscles for positioning parts of the therapeutic device of FIG. 1 for treatment of headaches in accordance with an embodiment.

A large amount of headaches are tension headaches. It is believed that most tension-type headaches stem from inflamed suboccipital muscles. As depicted in FIG. 10, the suboccipital muscles 60 are generally provided at a base of a patient's skull 62 below the occipital bone and extend towards cervical vertebrae 64 of the neck. The suboccipital muscles 60 are formed from groups or sets of muscles-two generally straight sets (a first set formed from muscles 68 and a second set formed from muscles 70) and two oblique sets (a third set formed from muscles 72 and a fourth set formed from muscles 74). Restrictions of blood flow and blood vessel problems near these muscles may cause migraines. The application of pressure on these suboccipital muscles for a short period of time has been found to provide relief when some headaches or migraines occur.

However, manual application of pressure to the suboccipital muscles can vary based on the amount of pressure (too hard, not hard enough/too soft), the location of applied pressure, and/or the size of a third-person's fingers or thumbs used to apply the pressure to a patient. It can also be difficult for a patient to provide self-treatment and apply such pressure to these points and muscles on the back of their own head.

Accordingly, the herein disclosed device and method is designed to address such issues, including providing a self-serve acupressure device that gives a user the ability to apply consistent, well-aimed pressure, of a desired and therapeutic amount, onto the suboccipital muscles while also having that pressure come from an acceptable size applicator.

Figure 19:
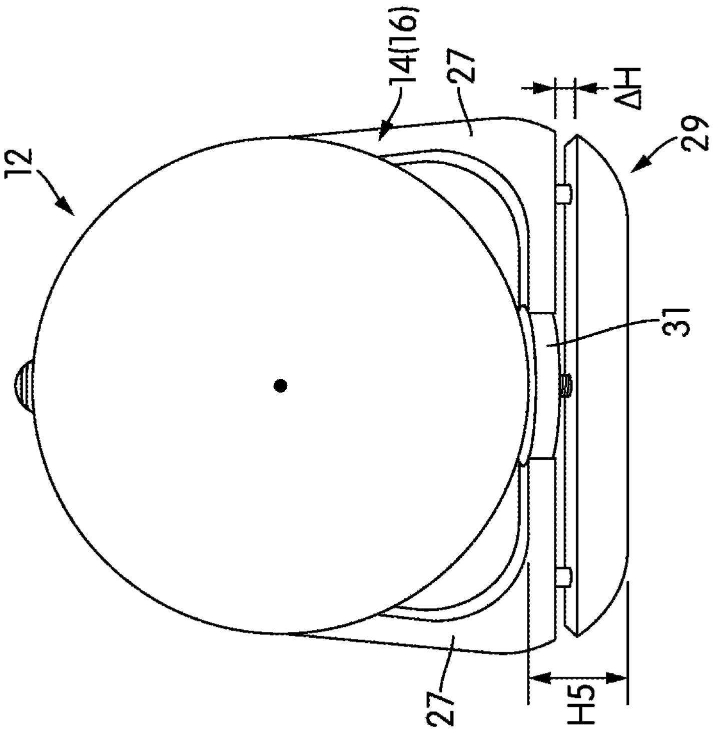
FIGS. 18 and 19 show an end view of the therapeutic device of FIG. 13 in a first position and a second position.
Figure 20:
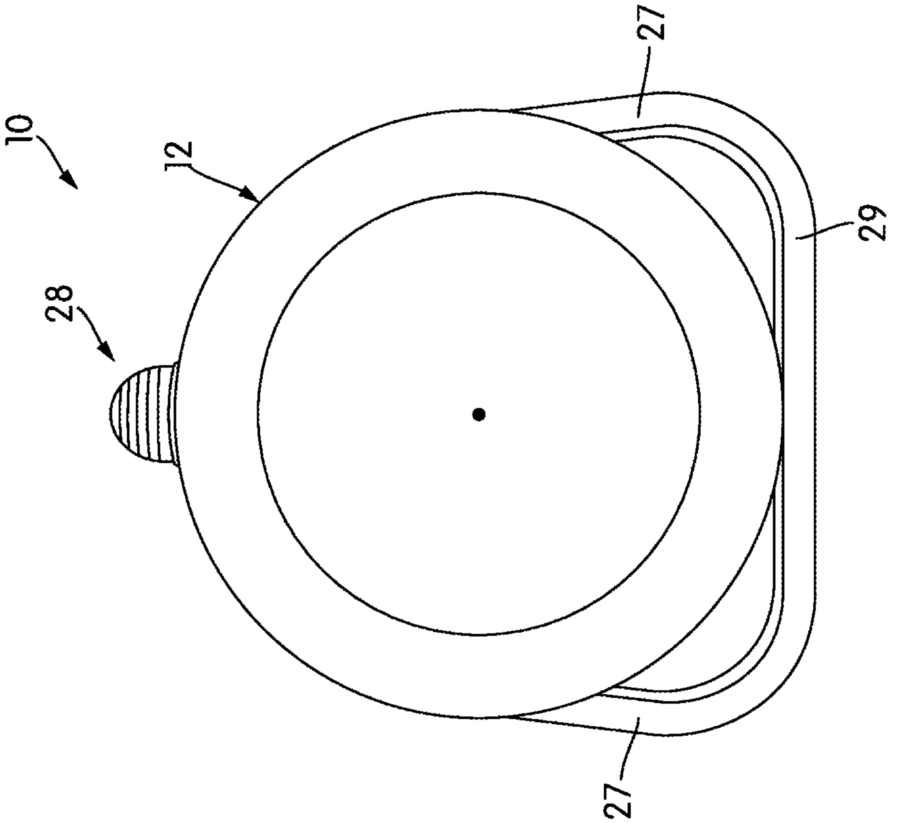
FIGS. 20 and 21 are an end view and a side perspective view, respectively, of a therapeutic device in accordance with yet another embodiment.
Figure 21:
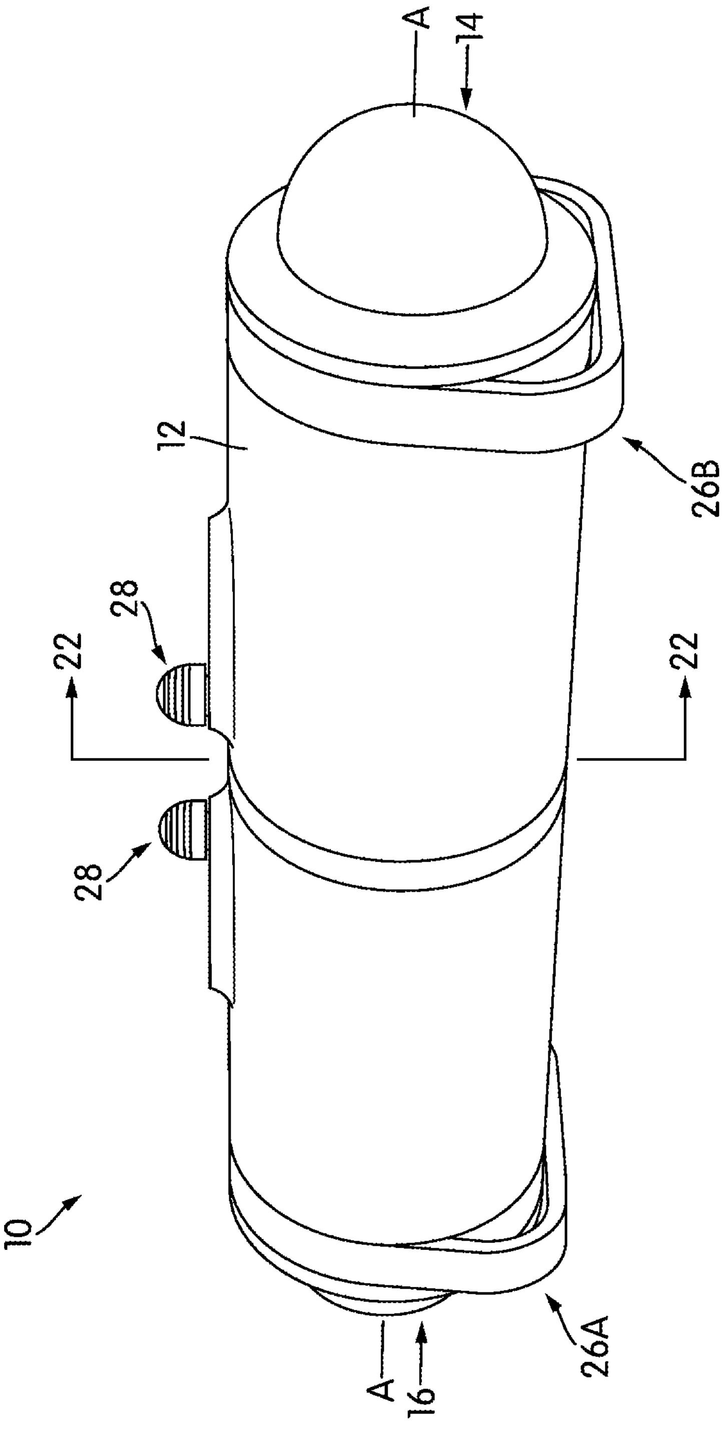
Figure 22:
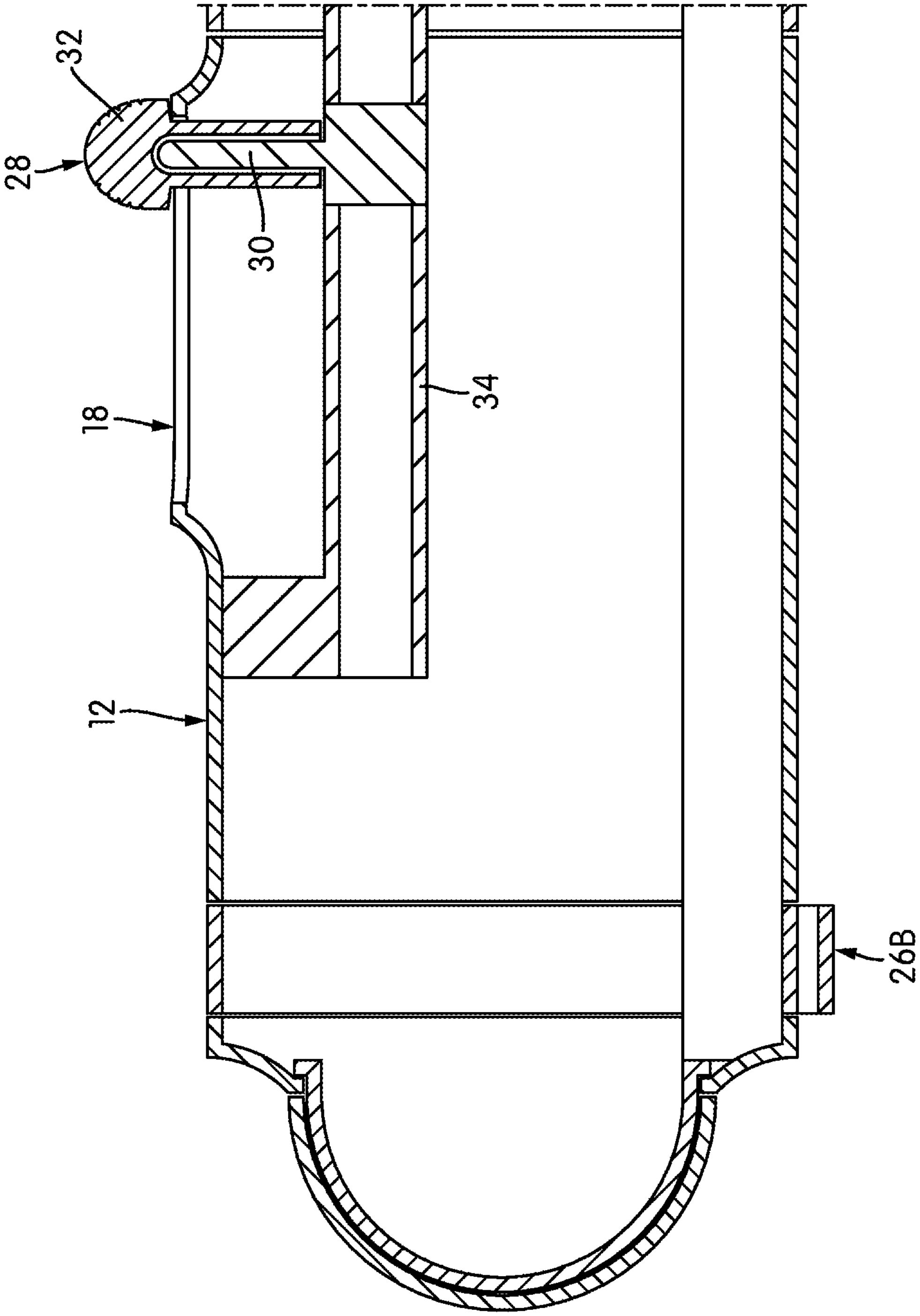
FIG. 22 is a cross sectional view taken along line 22-22 of the therapeutic device of FIG. 21 showing an example of adjustment features in accordance with an embodiment.
Figure 24:
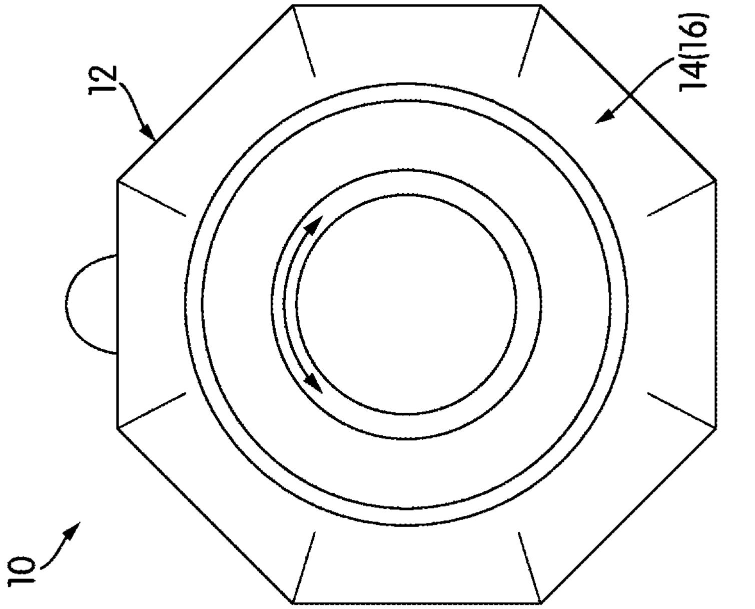
FIGS. 23 and 24 are a side perspective view and an end view, respectively, of a therapeutic device in accordance with still yet another embodiment.
Figure 23:
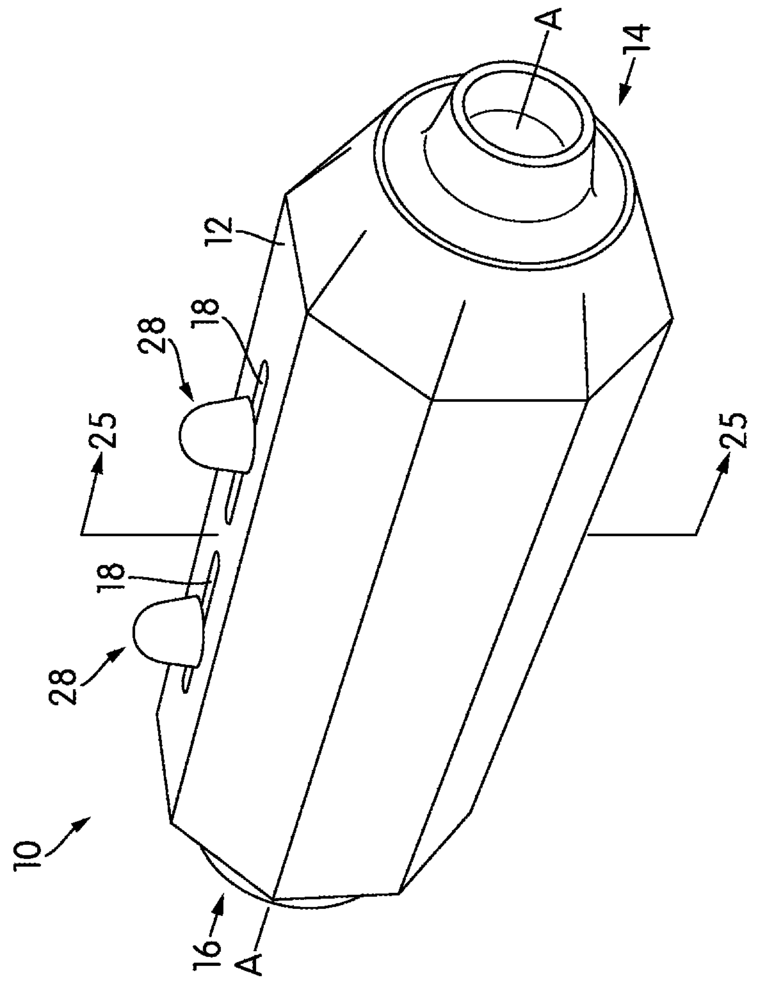
Figure 25:
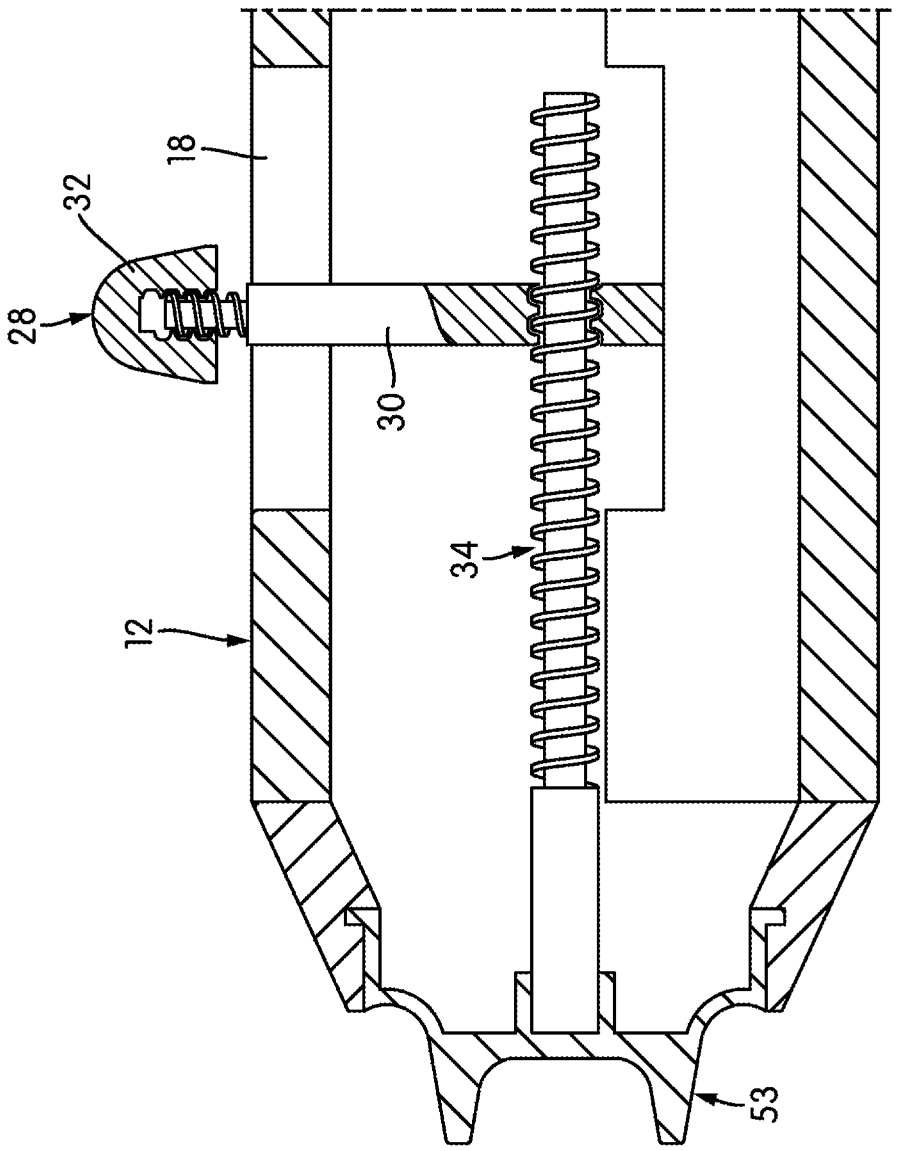
FIG. 25 is a cross sectional view taken along line 25-25 of the therapeutic device of FIG. 23 showing an example of adjustment features in accordance with an embodiment.
Figure 26:
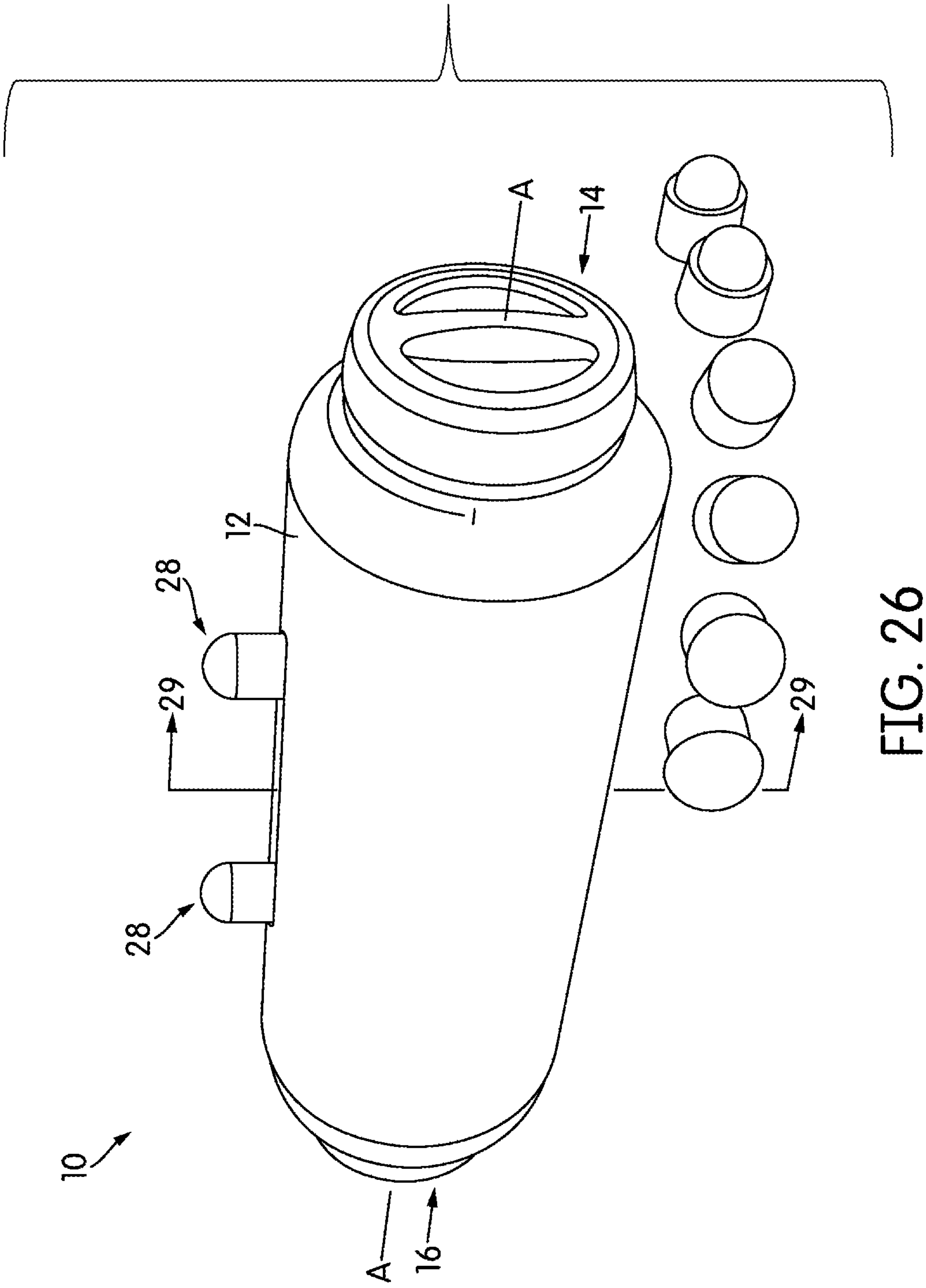
FIGS. 26, 27, and 28 are side perspective, end perspective, and end views, respectively, of a therapeutic device in accordance with another embodiment.
Figure 28:
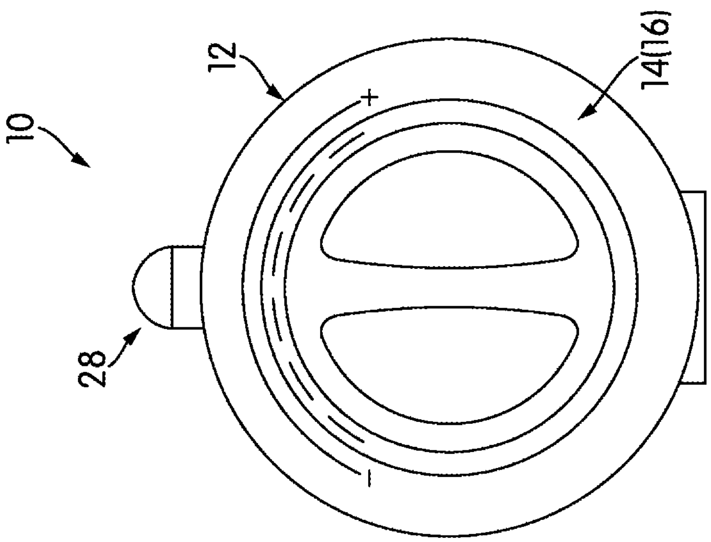
Figure 27:
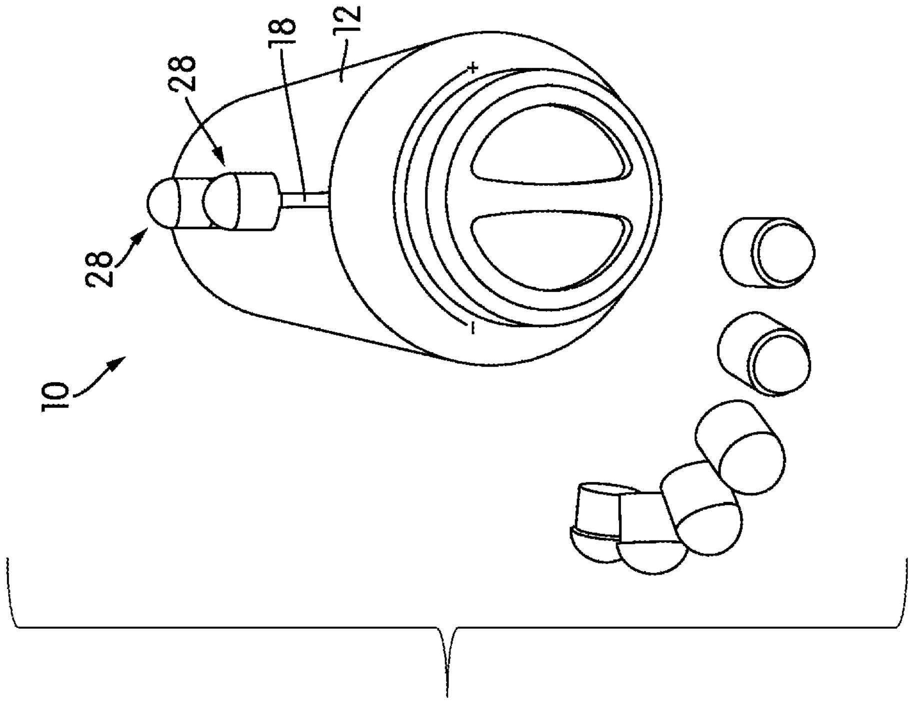

FIGS. 1-7 illustrate multiple views of a therapeutic, acupressure device 10 (or "therapeutic device," as noted herein) in accordance with one embodiment of this disclosure. FIGS. 14-19 illustrate multiple views of another therapeutic device 10 in accordance with another embodiment of this disclosure. FIGS. 20-22 illustrate a therapeutic device in accordance with yet another embodiment. FIGS. 23-25 illustrate a therapeutic device in accordance with still yet another embodiment. FIGS. 26-29 illustrate a therapeutic device in accordance with another embodiment. FIGS. 33-40 show yet another embodiment of a therapeutic device in accordance with this disclosure.

For purposes of clarity and brevity, like elements and components throughout the Figures are labeled with same designations and numbering as discussed with reference to FIGS. 1-7. Thus, although not necessarily discussed entirely in detail herein with individual reference to each of the FIGS. 14-40, one of ordinary skill in the art should understand that various features associated with the therapeutic devices 10 of FIGS. 14-40 are similar to those features discussed with reference to FIGS. 1-7 herethroughout. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

The therapeutic device 10 as disclosed in each of the embodiments herein is designed to serve as a device for applying pressure on and/or to certain spots or points of a user's body (e.g., head or neck), to provide an effect that reduces and/or relieves the user of pain (e.g., of headaches and/or migraines). The therapeutic device 10 has a body 12 and a pressure applicator device (e.g., first and second pressure applicators 28) that extends from the body 12, in accordance with embodiments herein. The body 12 may be designed to at least partially accommodate or fit into a curve of a patient's neck, thus providing cushioning and support for the patient's neck during use. The pressure applicator device is configured to apply pressure to at least two points on a patient's body, e.g., on or adjacent to suboccipital muscle points (or at the base of the skull, on the neck, etc.), when positioned for use. As understood herethroughout, during use of the therapeutic device 10, the pressure applicator device, e.g., first and second pressure applicators 28, provides a simultaneous application of pressure to and through the at least two points and to the desired muscle (e.g., suboccipital muscles). In an embodiment, the points for applying localized pressure using applicators 28 may be encompassed within an area associated with a particular muscle. In addition to the body 12 and pressure applicator device/applicators, a stabilizing device in the form of one or more feet or stands, or multiple sets of feet 26, or stands 26A, 26B, may be optionally provided on/with the body 12 to position and stabilize the therapeutic device 10 for use.

The body 12 has a first end 14 and a second end 16 that extends in a longitudinal direction along axis A-A (see, e.g., FIGS. 1 and 2 and FIGS. 14 and 15). The body 12 may be a generally tubular body and may take the form of a circular roller, for example. However, such a shape is not intended to be limiting. The body 12 may have a rounded, elliptical or ovular shape, for example, in accordance with some embodiments. The body 12 may alternatively include any number of flat sides thereon and/or a combination of rounded and flat sides. The body 12 may alternatively have a hexagonal, octagonal, or decagonal shape, for example. FIGS. 13A-13D illustratively shows some examples full round, faceted, semi round, and hex round—of shapes that may be used to form body 12, in accordance with embodiments. FIGS. 14, 21, 23, and 26 show other shapes for body 12.

Figure 1:
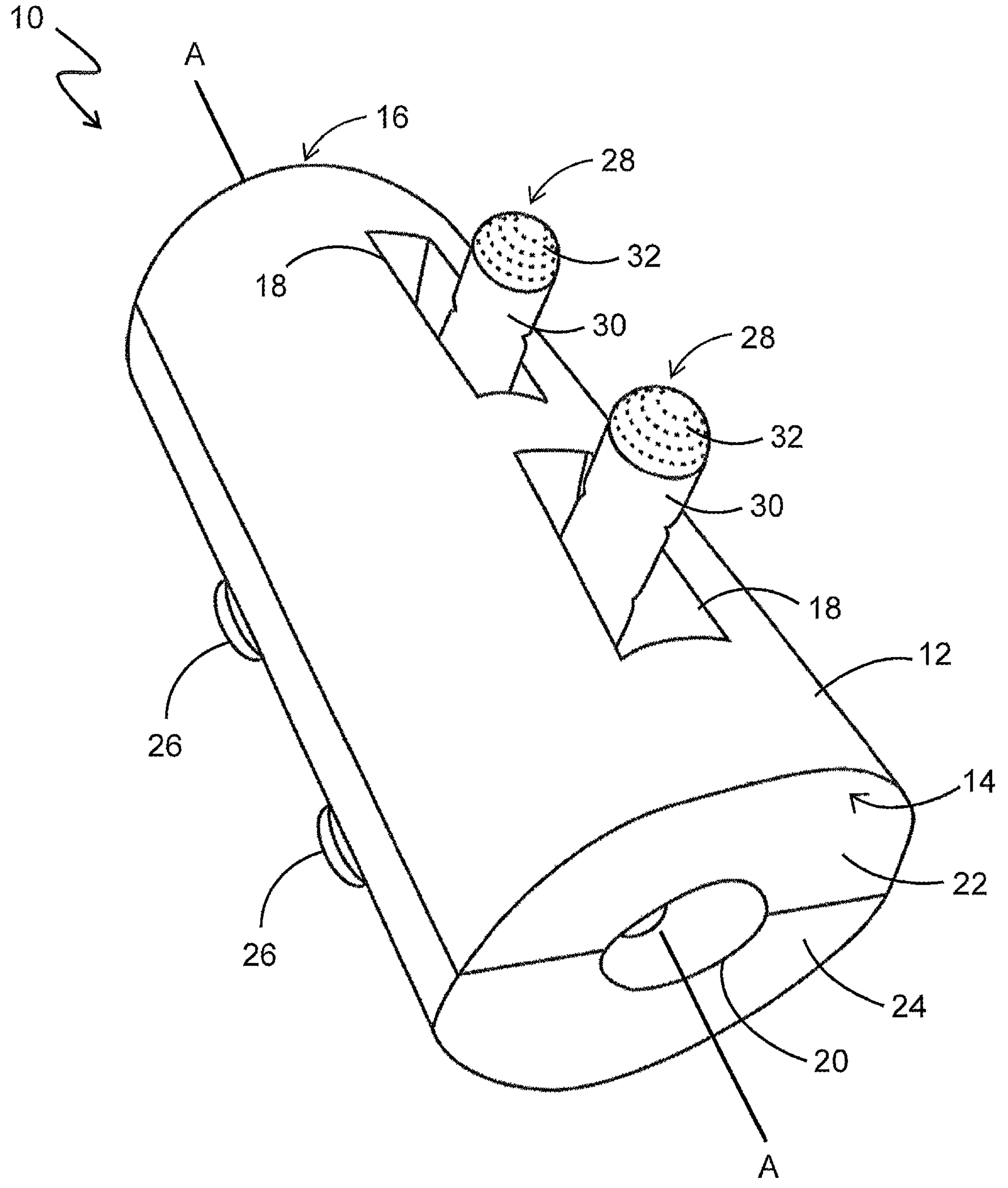
FIG. 1 is a side perspective view of a therapeutic device in accordance with an embodiment.
Figure 9:
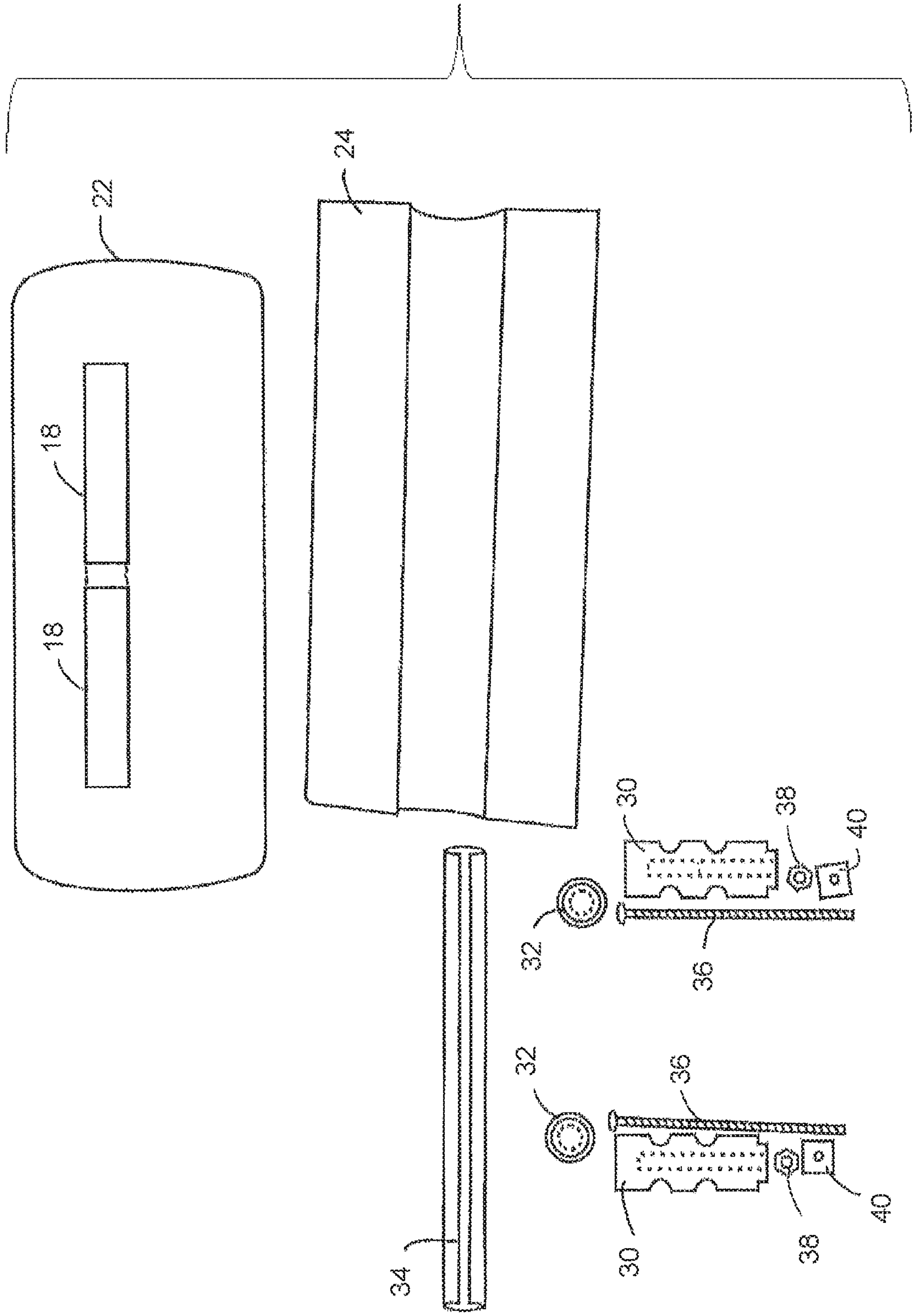
FIG. 9 shows exemplary parts of the therapeutic device of FIG. 1.

The body 12 may be a singular, integral body or formed from multiple pieces into an integral form. In an exemplary illustration of FIGS. 1-7, the body 12 is formed from a first (top) half piece 22 and a second (bottom) half piece 24, as shown in FIG. 9, which are aligned and secured together, e.g., via adhesive, to form the tubular body 12 as shown in FIG. 1. In an embodiment, a through-hole 20 is provided through the body 12. The through-hole 20 may be used to provide access to the pressure applicators 28 or parts thereof, for example. However, the through-hole 20 need not be provided. Accordingly, each half piece 22 and 24 may include a half of the through-hole 20 therein, and the halves 22 and 24 may be aligned to form the through-hole 20.

Figure 2:
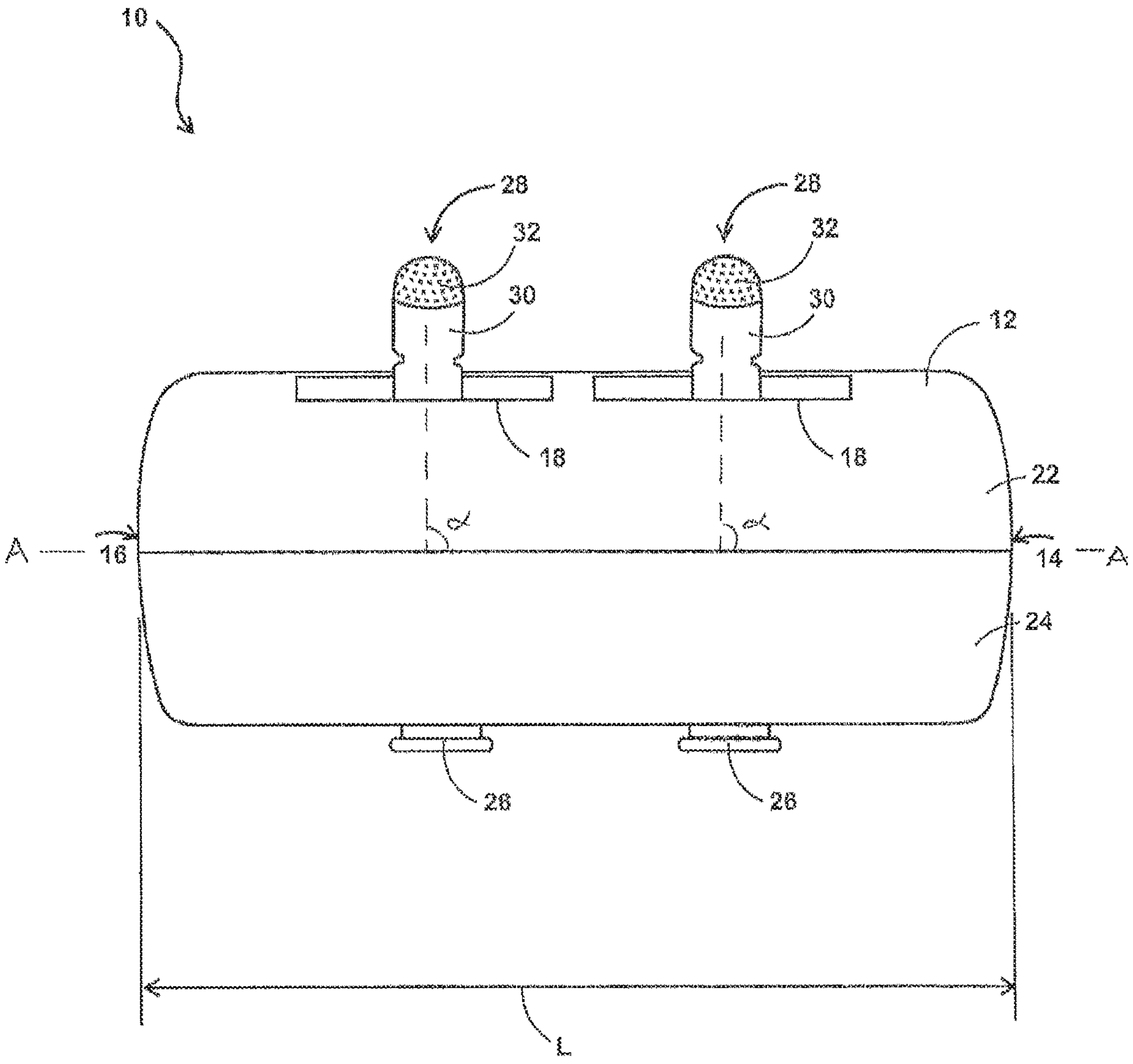
FIG. 2 is a front view of the therapeutic device of FIG. 1.
Figure 3:
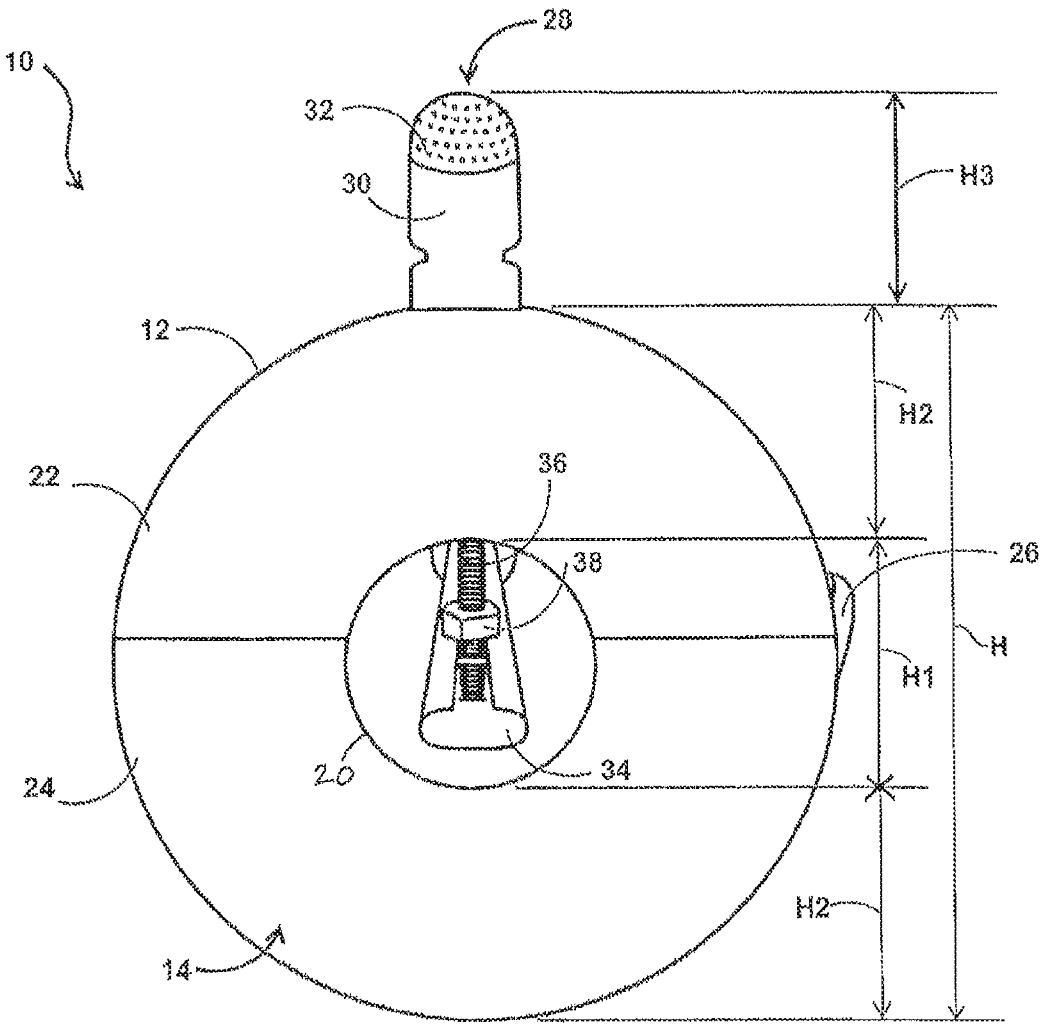
FIG. 3 is a left view of the therapeutic device of FIG. 1.

In one embodiment, ends of the body 12 may be closed or secured such that the through hole is not visible. In another embodiment, an adjustment device (such as devices described later with reference to FIGS. 14-40) may be provided on one or both ends of the body 12. In an exemplary illustrations of FIGS. 14-29, the body 12 is formed from a central tubular portion with a through-hole or hollow area therein (which can be viewed, for example, in the cross-sectional views). The body 12 has an overall length L (see FIG. 2 and FIG. 15) measured between its ends 14 and 16, and an overall height H (see FIG. 3 and FIG. 15) measured between a bottom surface and a top surface. FIG. 3 also shows that the through-hole 20 may have a height H1. Both of the first half piece 22 and the second half piece may have a height H2 from the through-hole half to a side surface thereof. Accordingly, the overall height H equals H2+H1+H2. In another embodiment, however, the heights of the first half piece 22 and the second half piece 24 may differ. The height H may be also referred to as a width or a diameter of the body 12 (when assembled).

The overall length L of the body 12 may be a function of flexibility and stability (e.g., based on a surface which the device 10 is positioned on). The overall height H may be a function of access to the suboccipital muscles and comfort (depending on the size of the patient).

In an embodiment, the overall length L is between approximately 4.0 inches to approximately 14.0 inches. In one embodiment, the overall length L is between approximately 6.0 inches to approximately 12.0 inches. In another embodiment, the overall length L is between approximately 7.0 inches to approximately 9.0 inches. In one embodiment, the overall length L is approximately 7.0 inches.

In an embodiment, the overall height H is between approximately 1½ inches to approximately 4 inches. In another embodiment, the overall height His approximately 2¹⁄₁₂ inches to approximately 3½ inches. In one embodiment, the overall height H is approximately 3¼ inches. In yet another embodiment, the overall height H is approximately 3 inches.

In accordance with an embodiment, the dimensions of the body 12, e.g., the overall length L and/or the overall height H, are proportioned or customized based on a person or patient using the device (e.g., child or adult). The height H (or width or diameter) of the body 12 should not be limited.

The materials used to form the body 12 are not intended to be limiting. The body 12 may be formed from any number of materials, including, but not limited to, foam. In one embodiment, the body 12 is formed from an extruded foam material. In an embodiment, the body is formed of a soft EVA foam material. In another embodiment, the body 12 is formed from a plastic material that is filled with a filler material. In an embodiment, a softer foam material may be used on the outside of the body 12 while an interior of the body 12 is formed or molded from a harder plastic. The body 12 may be formed or molded such that it has a hollow portion therein.

Figure 35:
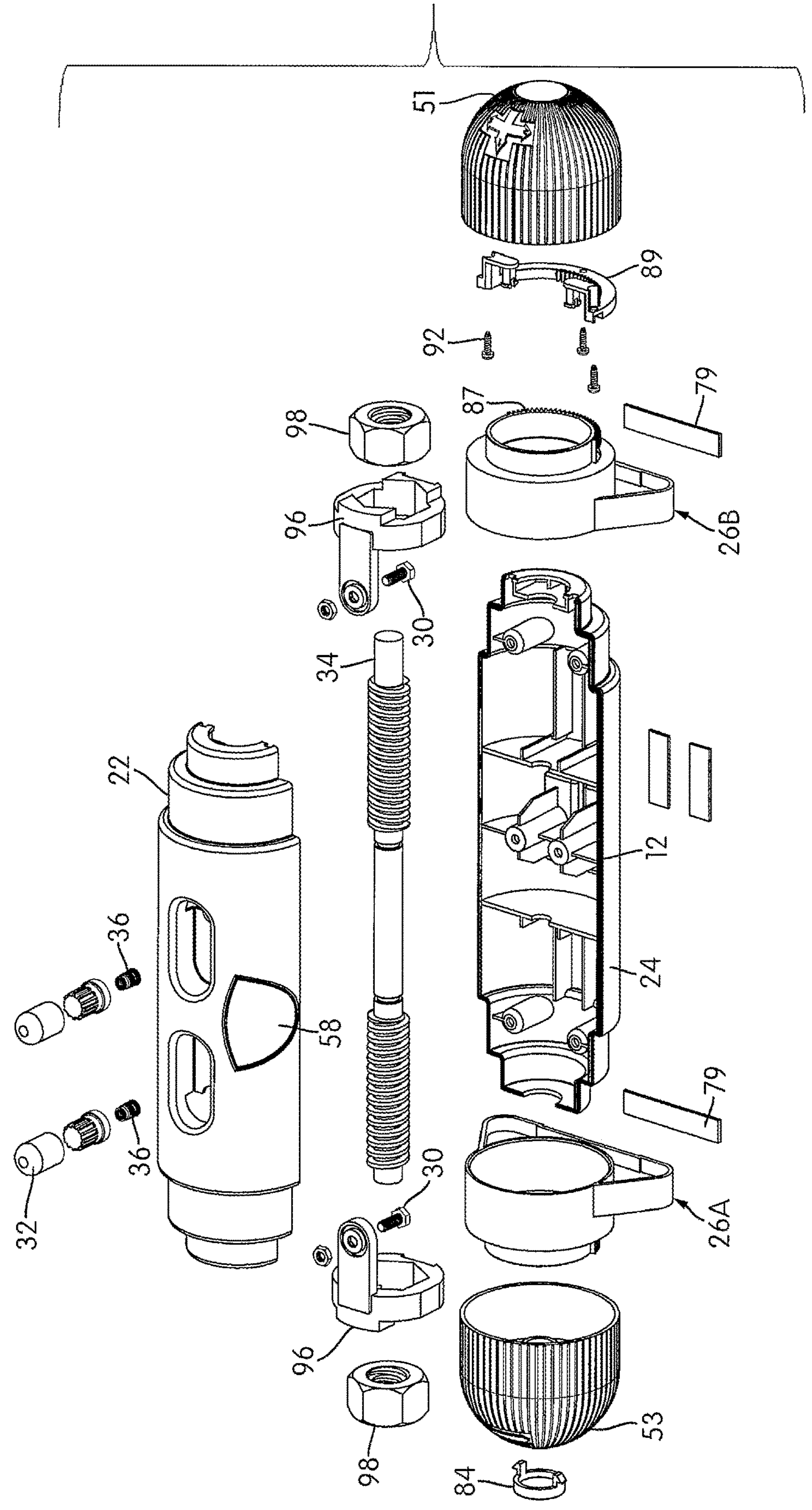
FIG. 35 is an exploded view of the parts of the therapeutic device shown in FIGS. 34-35.

An example of the parts used to form the pressure applicators 28 is shown in FIG. 9. FIG. 35 shows an alternate example of parts used to form pressure applicators 28. Each applicator 28, as illustrated, may have a body portion 30 and a head or tip 32 attached to the body portion 30. A fastener 36 (e.g. a screw) may be positioned to extend at least partially into a hole within the body portion 30. In an embodiment, the fastener/screw 36 is the body portion 30. Each of the pressure applicators 28 have a portion that extends away from a surface the body 12, e.g., above the tubular body. FIG. 3 shows that the pressure applicator 28 may extend a height H3 above a surface of the body 12, the height H3 being measured from the surface to a top of the pressure applicator 28 (e.g., a top of the tip 32). In accordance with an embodiment, each pressure applicator 28 extends a height H3 that is between approximately 0.25 inches to approximately 3.0 inches above the surface or top of the body 12, or approximately 1.5 inches above the surface or top of the body 12, or 0.25 to 2.5 inches. In one embodiment, the height H3 is between approximately 0.5 inches to approximately 2.5 inches. In another embodiment, the height H3 is between approximately 1.0 inches to approximately 2.0 inches. In yet another embodiment, the height H3 is approximately 1.5 inches above the surface or top of the body 12.

Figure 6:
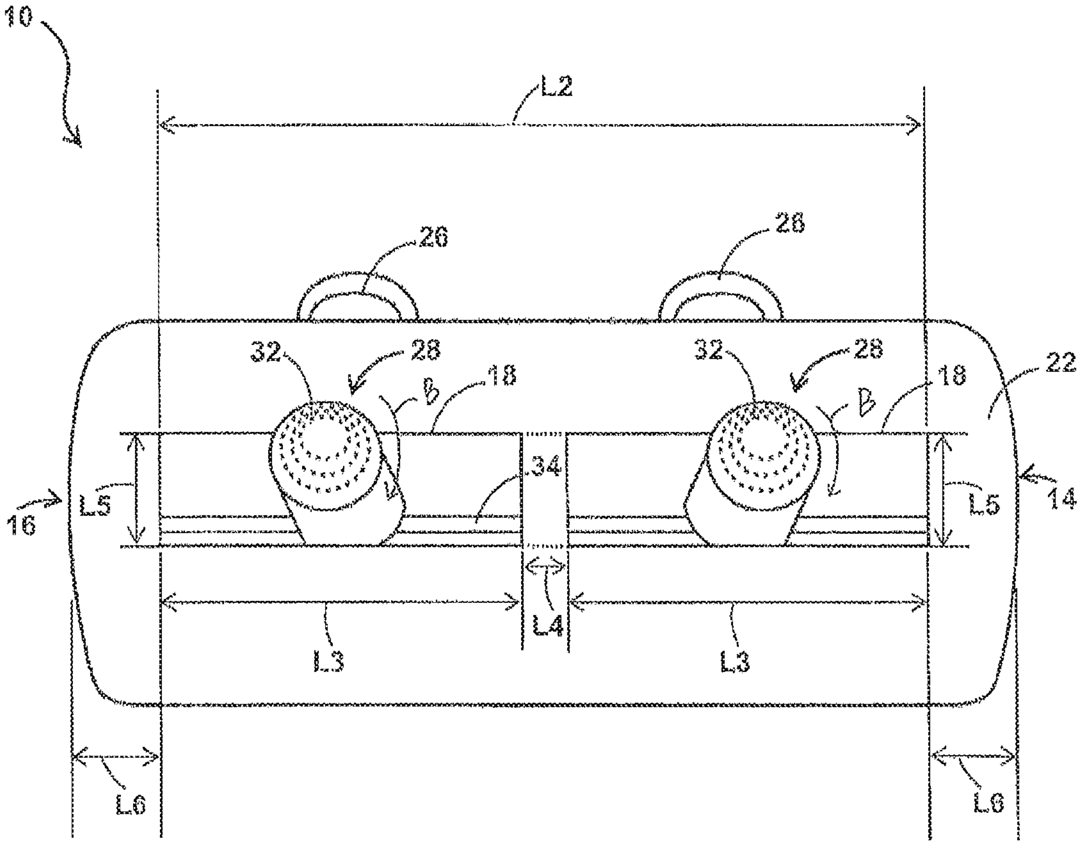
FIG. 6 is a top side view of the therapeutic device of FIG. 1.

The body 12 may include one or more slots for the pressure applicators 28 to extend through. For example, the first half portion 22 may include longitudinal slots 18 therethrough for a portion of each applicator 28 to extend through. As shown in FIG. 6, in a case of two slots 18, each slot 18 may have a length L3 and a width L5. End of the slots 18 may be spaced a length L4 from each other. A length L2 extends from an outer end of a first slot adjacent to end 16 to an outer end of the second slot 18 adjacent to end 14. A length L6 is provided between the outer ends of each slot 18 and their respective ends 14 or 16.

However, it should be noted that although two separate slots are shown in the Figures, it is also envisioned that a single, longitudinal slot (as generally noted in FIG. 6) may also be provided to accommodate both pressure applicators 28. Such a single slot may be of length L2, for example.

In an embodiment, the length L2 is approximately 6 inches. In an embodiment, the length L3 is approximately 2¼ inches. In an embodiment, the width L5 is approximately ¾ inches. In an embodiment, the length L4 of the spaced between the slots 18 is approximately 1½ inches. In an embodiment, the length L6 is approximately ½ inches.

The pressure applicators 28 are configured for translational movement relative to one another to alter their spacing and positions at which to simultaneously apply pressure to the suboccipital muscles of a patient. In an embodiment, the pressure applicators 28 may be slidingly adjustable (left and right, or horizontally) relative to one another along the body 12 in a longitudinal direction along the longitudinal axis A-A of the therapeutic device 10. The longitudinal adjustment may be used to accommodate different patients, for example, so that the pressure applicators may be properly positioned on a suboccipital muscle of the patient. In accordance with some embodiments, the pressure applicators 28 may be configured to move simultaneously relative to one another, i.e., a length or a width between the applicators 28 may be adjusted by simultaneously moving the pressure applicators 28 along the axis A-A (towards or away from each other).

It should be noted that although the Figures depict the pressure applicators 28 as separate devices, such illustrations are not intended to be limiting. That is, the pressure applicators 28 may be connected together and/or designed as part of a single device or a single body that is configured to apply pressure via at least two points on suboccipital muscles of the patient as well as configured to be adjustable so that the at least two points through which the pressure is applied to the suboccipital muscles of the patient can be altered. As noted previously, the points that such a single device applies pressure to may be provided within a particular muscle area.

Figure 4:
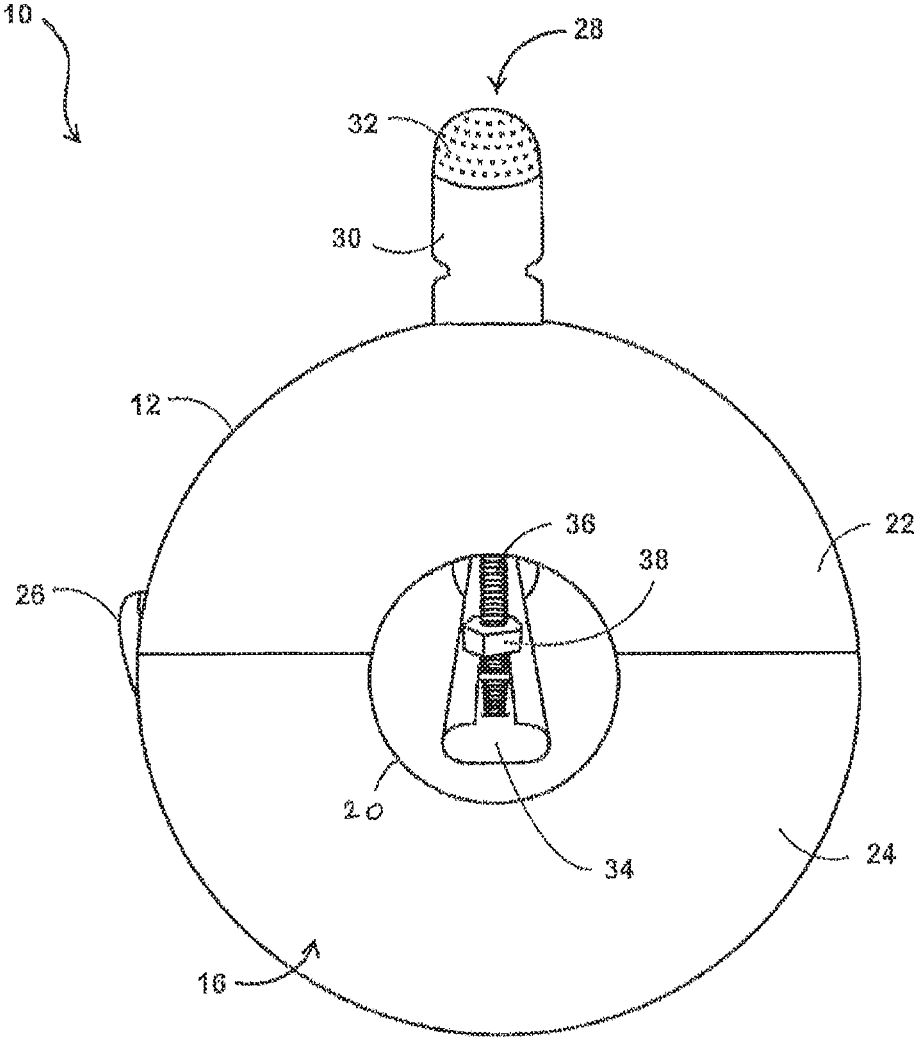
FIG. 4 is a right view of the therapeutic device of FIG. 1.

A rail 34, rod, or slide may be provided within the body 12 to allow for back and forth (longitudinal) movement of the pressure applicators 28. The rail 34 may be positioned in a parallel manner to the longitudinal axis A-A of the body 12, for example. As seen in FIGS. 3 and 4, the rail 34 may be positioned within the through-hole 20 of the body 12. A securement device may be used to secure the applicator(s) 28 in position. In the illustrative embodiment, nuts 38 and washers 40 may be provided as part of a securement device for each applicator 28 (see also FIG. 9). For example, each washer 40 may be placed on each fastener 36 and the fasteners 36 along with their washers 40 may be slid into an open end of the rail 34. The washers aid in securing the fastener 36 from linearly moving out of the rail 34 and may assist in smoother longitudinal movement. Each nut 38 may be positioned on a threaded part of the fastener 36 such that, when the fastener 36 and washer are placed within the rail, the nut 38 is positioned on an opposite (top) side of the rail 34. The nuts 38 may be loosened (moved away from the rail 34) such that the fasteners 36 are configured for movement relative to and within the rail 34. Tightening of the nuts 38 (moving them towards the rail 34) may secure the fasteners and thus the pressure applicators 28 in position. In one embodiment, the tightening and securement of the pressure applicators 28 is performed by rotating the body 30 of the pressure applicator 28 as indicated by arrows B in FIG. 6 (e.g., in a clockwise direction). Rotation of the pressure applicators 28 in an opposite direction (e.g., in a counterclockwise direction) can loosen the nuts 38 and applicators 28, to allow for adjustment along the rail 34.

Of course, the use of nuts and washers as part of pressure applicators 28 is exemplary only, and not intended to be limiting. Other devices or parts may be used to secure the pressure applicators 28 in position, such as shown and described with reference to FIGS. 14-40 including friction fitting of the pressure applicators to a part of the rail, rod, or slide. Also shown and discussed is use of a screw-type rod within the body 12 for allowing longitudinal (and relative) movement of the applicators 28, in accordance with an embodiment.

In accordance with an embodiment, each of the pressure applicators 28 may be positioned at an angle α (see FIG. 2) relative to the longitudinal direction along axis A-A of the body. In one embodiment, the angle α of each of the pressure applicators 28 is the same. In another embodiment, the angle α of each of the pressure applicators 28 is different. In one embodiment, the angle α of the pressure applicators 28 is a 90 degree angle (such as illustrated in FIG. 2) such that the pressure applicators are substantially perpendicular to the body 12. In another embodiment, the angle α of the pressure applicators 28 is an acute angle. In yet another embodiment, the angle α of the pressure applicators 28 is an obtuse angle.

In accordance with one embodiment, each of the pressure applicators 28 may be adjusted or tilted relative to the axis A-A of the body 12 to a desired angular position. For example, a patient can adjust the applicator(s) 28 such that they are positioned on their suboccipital muscles in a comfortable manner for use.

In an embodiment, the pressure applicators 28 may be locked in a desired angled position. For example, a lock (not shown), which may or may not be a separate device from the previously-described securement device, may be associated with each of the applicators so that each applicator can be locked in a desired angular position. In another embodiment, the pressure applicators 28 may be moved between predefined, relatively angular positions and locked (even temporarily) in place.

In yet another embodiment, the angular position of the pressure applicators 28 relative to the axis A-A may be adjusted by moving the body 12 itself to a desired angular position. For example, the body 12 may be rotated about axis A-A (e.g., forwards or backwards) to thereby move the applicators 28 to a different angle.

In still yet another embodiment, one or more knobs may be provided on the therapeutic device 10 in order to adjust the pressure applicators 28. For example, a knob may be provided on either side of the body 12, such as shown in embodiments illustrated in FIGS. 14-35. The knob(s) may be configured for rotation (e.g., about axis A-A) and designed to translationally adjust [the relative position of] the applicators 28 and then optionally lock/secure them in place. The knob(s) may also or alternatively be designed to adjust the angular position of the body 12, and thus the applicators 28, about axis A-A. In an embodiment, the knob(s) may be associated with a resilient component, such as a spring, so that movement of the knob(s) is transferred via tensioning (or releasing) of the spring to/from the pressure applicators 28. The knob(s) may be rotatable or linearly moveable (e.g., moveable towards and away from the body 12 along axis A) to cause adjustment of the pressure applicators, for example.

As shown in the illustrated embodiments, for example, the shape, configuration, and design of the knob(s) is not intended to be limited. The knob(s) may include indentation, grip designs, handle portions, etc.

The therapeutic device 10 shown in FIGS. 14-17, for example, includes a first adjustment knob 51 on one end 14 and a second adjustment knob 53 on its other end 16. In accordance with an embodiment, first adjustment knob 51 is a knob configured for rotation to adjust an angle of the body 12 and/or pressure applicators 28 about axis A-A. In an embodiment, second adjustment knob 53 is a knob configured for rotation to adjust a relative width (or length) between the pressure applicators 28, i.e., to move the pressure applicators 28 towards and away from each other, longitudinally or horizontally along axis A-A. The adjustments may be friction fit or defined by distinct stops, for example. However, knobs at either end need not be provided. Further, in another embodiment, one or more knobs may be provided only at one end 14 or 16.

In still yet another embodiment, the pressure applicators 28 are configured for linear movement to adjust a length or height at which they extend from the body 12. That is, it is envisioned that the pressure applicators 28 may further move in a direction that is generally perpendicular to the longitudinal direction (e.g., a vertical direction). This may be to adjust the height H3 at which the pressure applicators 28 and/or their tips 32 extend away from the body 12, for example.

The pressure applicators 28 and/or their tips 32 are sized such that a localized, concentration of pressure may be applied to points associated with the areas or locations of suboccipital muscles (e.g., such as shown in FIG. 10) at the base of a patient's head and neck during use. In one embodiment, pressure applicators 28 and/or their tips 32 may be sized to target and apply pressure to one or more sets of the suboccipital muscles simultaneously. In one example, the pressure applicators 28 and/or their tips 32 may apply pressure to first and second sets of muscles 68, 70. In another embodiment, the pressure applicators 28 and/or their tips 32 are designed to apply pressure to at least one set of the sets 68-74 of suboccipital muscles.

Although noted as being attached to the body portion 30 of the pressure applicator 28, in an embodiment, the head or tip 32 may be integrally formed as part of the body 30 of the pressure applicator 28. That is, the body 30 of the pressure applicator 28 may be designed to include a tip for application of pressure (e.g., formed via molding), such that the tips are formed from a same material as the body 30.

The tips 32 of the pressure applicators 28 may be formed from a number of materials. In one embodiment, each tip 32 is formed from a molded plastic. In another embodiment, tips 32 may be formed from a cushioning material or foam.

Figure 17:
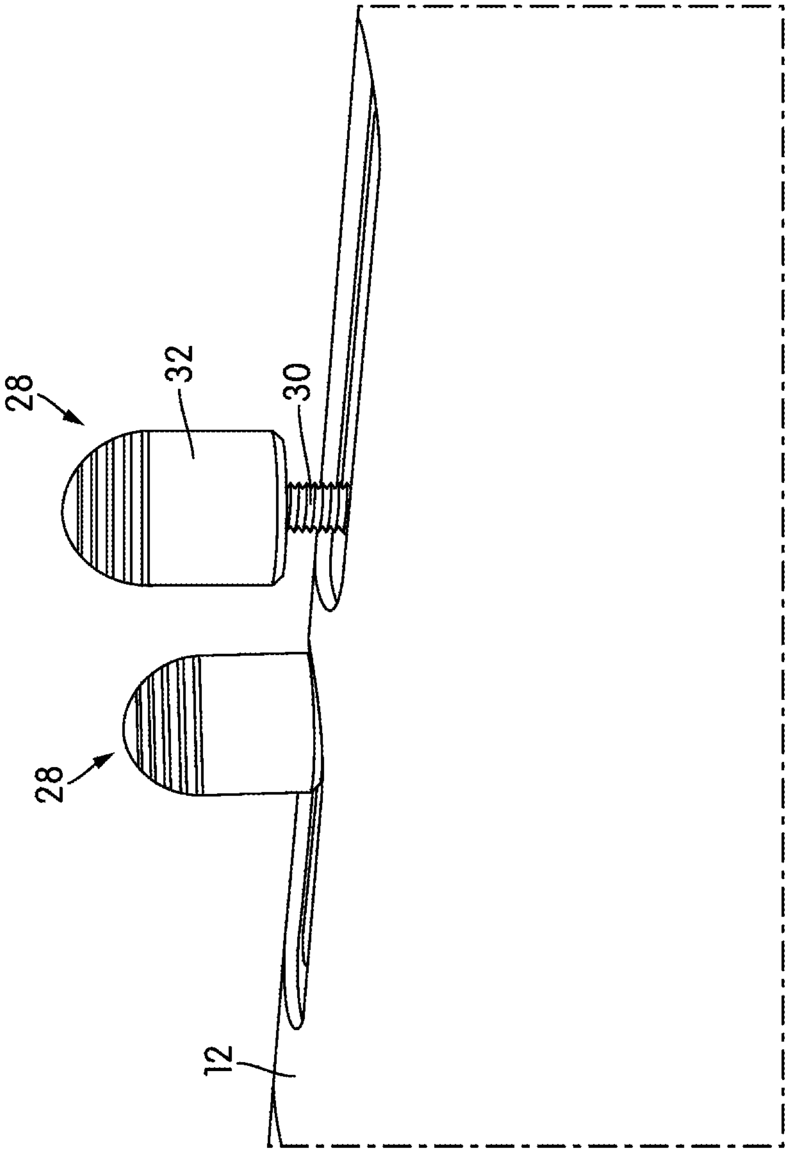
FIG. 17 is a detailed view of applicators of the therapeutic device of FIG. 13.
Figure 29:
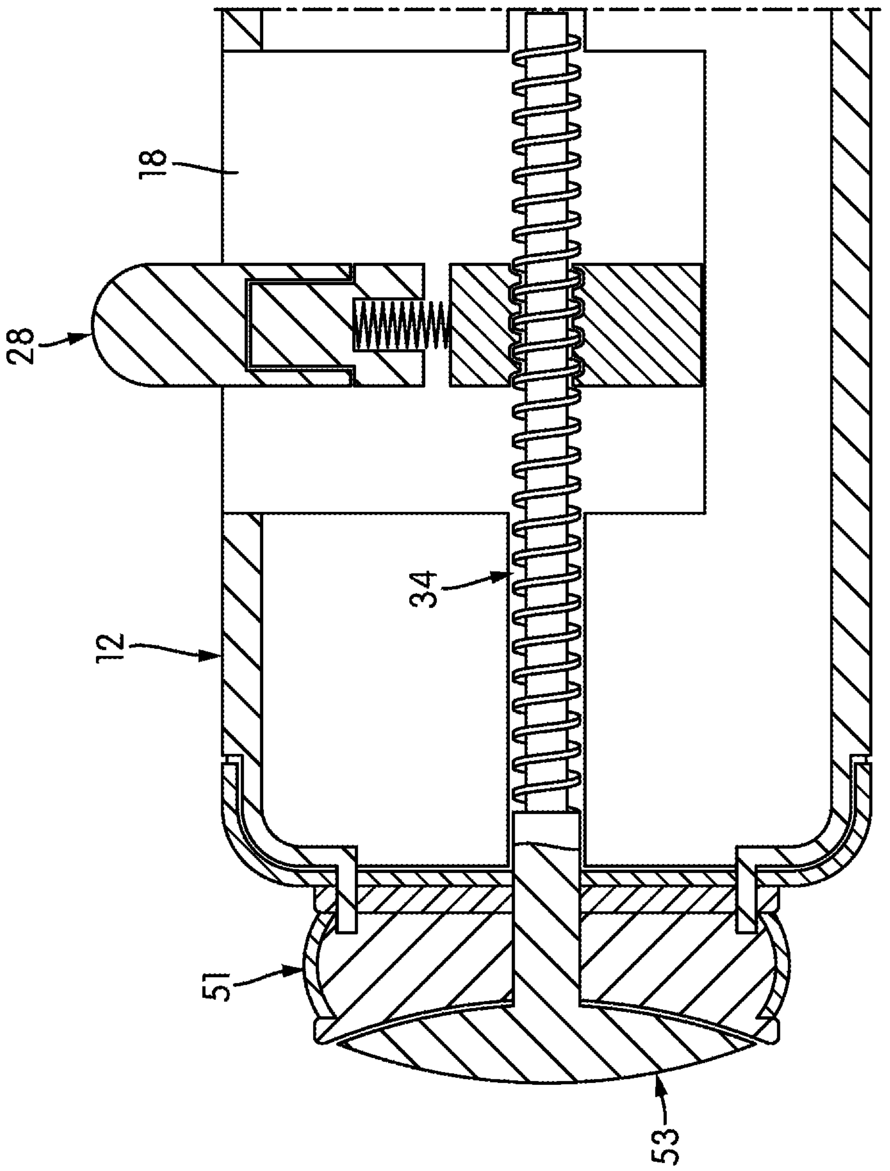
FIG. 29 is a cross sectional view taken along line 29-29 of the therapeutic device of FIG. 26 showing an example of adjustment features in accordance with an embodiment.
Figure 30:
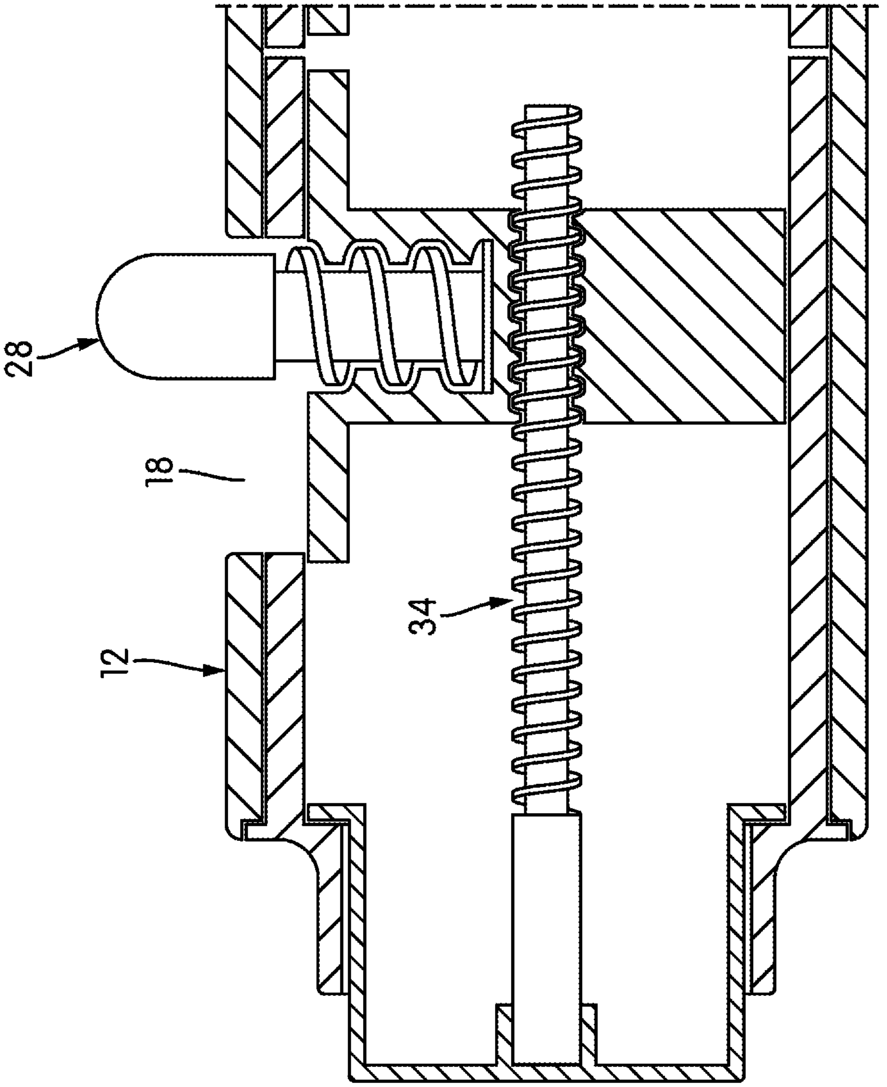
FIG. 30 is a cross sectional view of another therapeutic device showing an additional example of adjustment features in accordance with an embodiment.

The tips 32 may be secured as part of the pressure applicators 28 in a number of ways. In the exemplary illustrated embodiment, the tips 32 are adhered or glued to tops of the bodies 30. In another embodiment, the tips 32 may be secured via fastener 36; for example, the fasteners 36 and bodies 30 may be dimensioned such that an end of each fastener extends above the body 30, for positioning and secured of the tips 32 thereon (e.g., via placement of threads on an underside of the tips). In yet another embodiment, the tips 32 are threadingly engaged with the bodies 30 (e.g., by providing corresponding threads on the bodies 30 and tips 32, for connection in a screw-like fashion), such as shown in FIG. 17, FIG. 25, FIG. 30, or FIG. 37, for example. FIG. 17 shows that tip 32 may be attached to a body 30 in the form of a screw (the tip 32 thus including a female receiving portion therein such that the screw of the body 30 may be attached thereto), in accordance with an embodiment. The screw allows the tip 32 to be screwed/unscrewed or rotated thereon to adjust its height above the body 12. FIG. 25 also shows another embodiment of a tip 32 that is screwed onto a screw portion provided at a top of body 30. FIG. 30 also shows another embodiment of a tip 32 that incorporates a screw portion therein that is screwed into a top of body 30. In still yet another embodiment, the tips 32 are press-fit with the bodies 30. FIG. 22 shows an exemplary embodiment wherein the tip 32 is friction fit onto a receiving portion of the body 30 that provided on a rail or rod 34. FIG. 29 shows yet another embodiment wherein the tips 32 of the applicators are formed as spring-loaded replaceable applicator tips having a spring provided between the applicator body 30 and tip/head.

The heads or tips 32 of the pressure applicators 28 may have a texturized surface (e.g., generally represented in the Figures as dashed lines) or a smooth surface. For example, in one embodiment, the tips 32 may include raised protrusions or bumps thereon.

Figure 14:
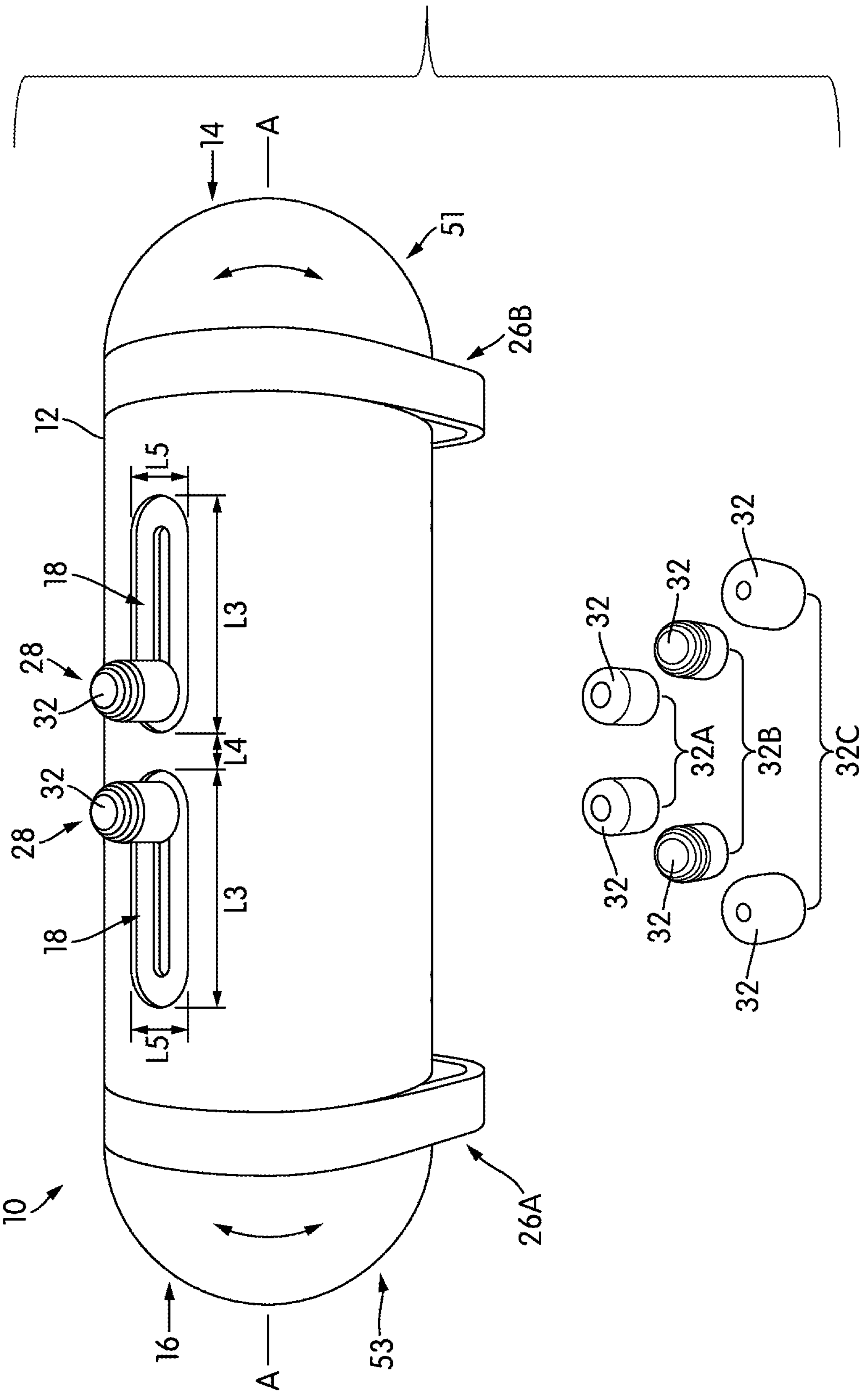
FIGS. 14, 15, and 16 are top, side, and bottom perspective views, respectively, of a therapeutic device in accordance with another embodiment.
Figure 15:
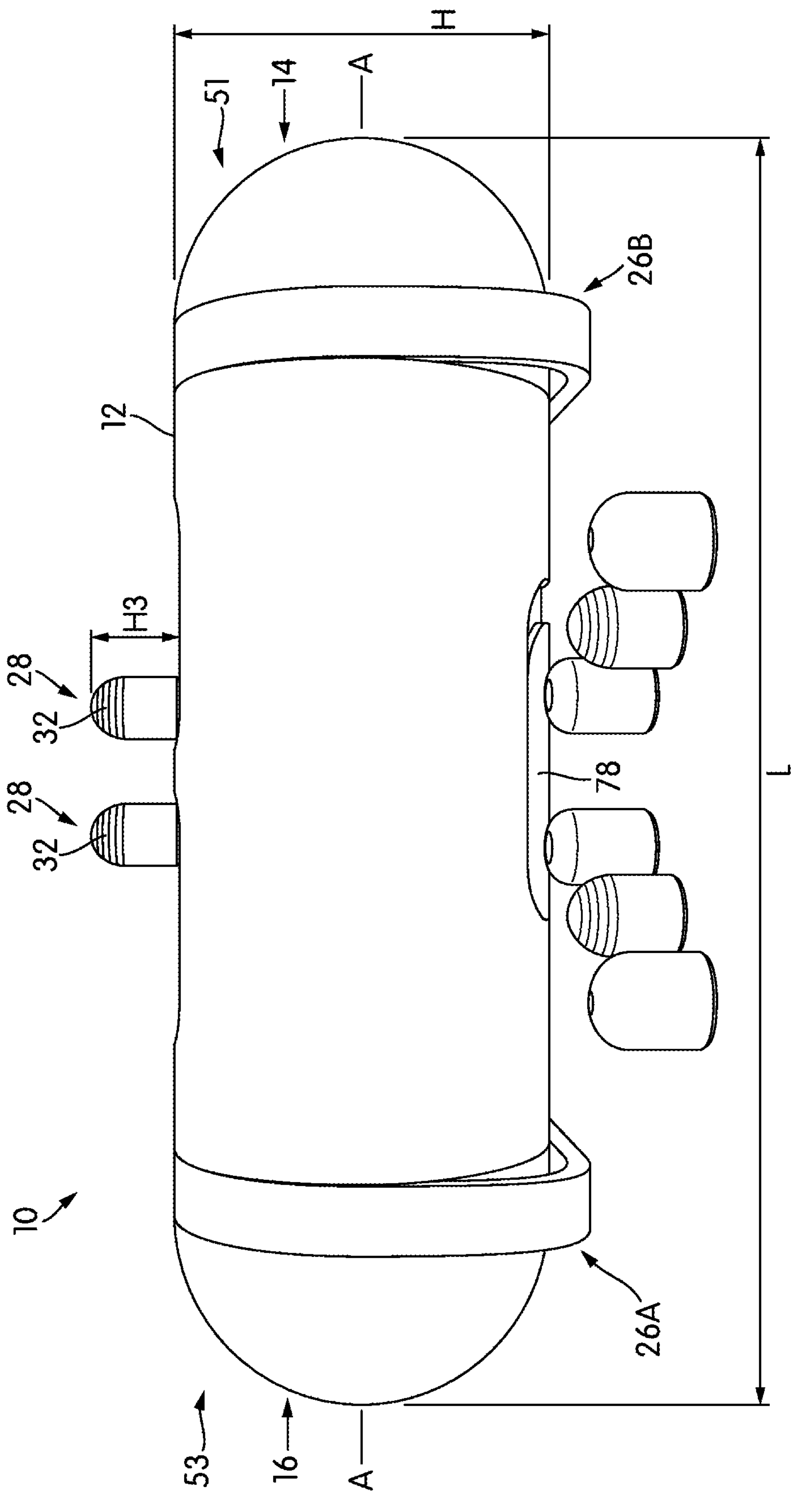
Figure 16:
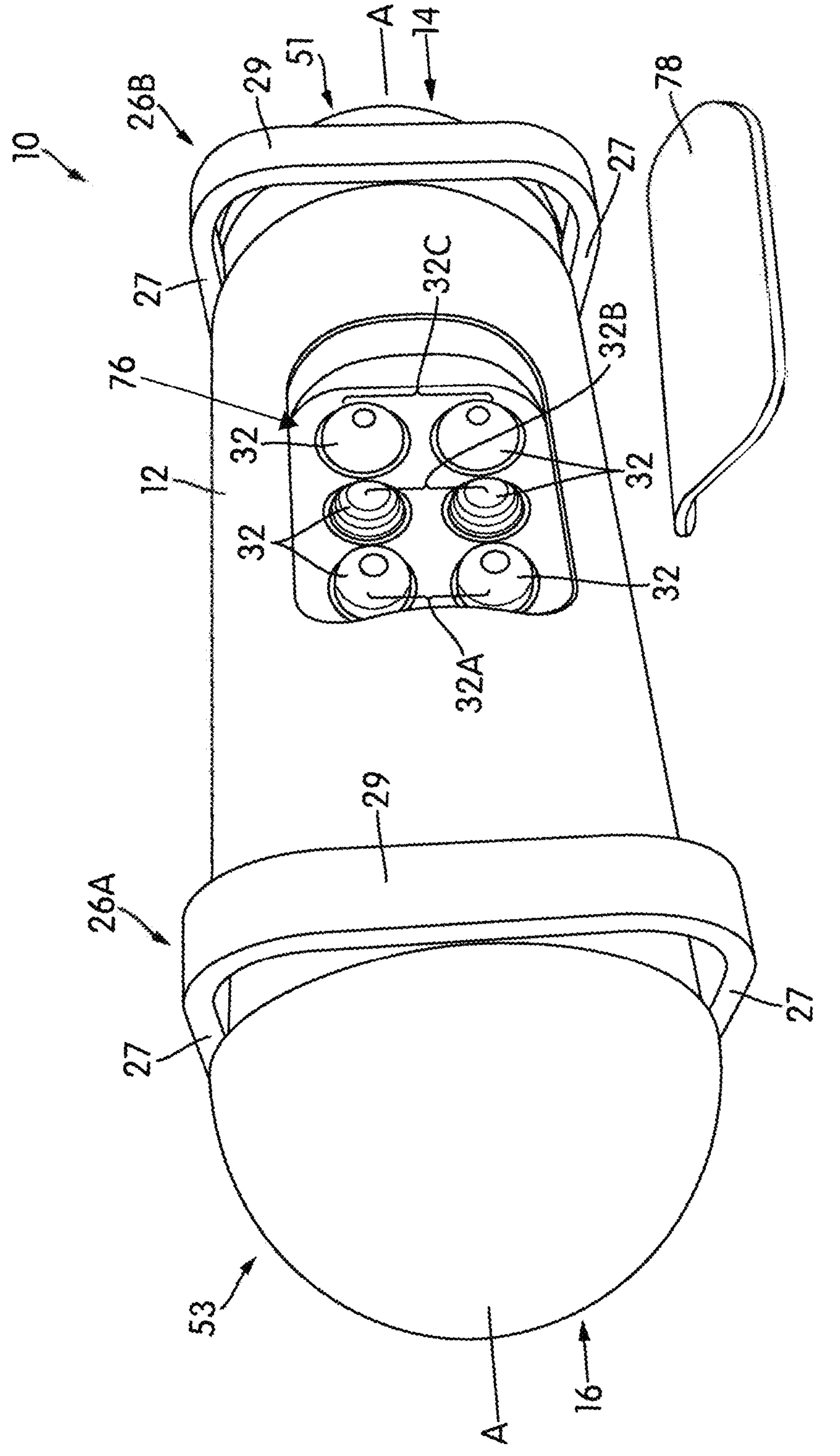

The size and features of the tips 32 as depicted in the Figures is not intended to be limiting. For example, in the illustrated embodiment, the tips 32 have dimensions (e.g., width or diameter, and surface area to apply pressure) that are similar to those of the bodies 30 of the pressure applicators 28. However, it is also envisioned that tips 32 of greater size than the bodies 30 (e.g., with a greater surface area than width of the bodies 30, due to greater width or diameter than the bodies 30) may be used. That is, tips 32 of the pressure applicators may be detachable and/or interchangeable. In an embodiment, sets or pairs of different sized tips 32 for the pressure applicators 28—e.g., sets 32A, 32B, 32C as shown in FIGS. 14-16—may be supplied with the therapeutic device, such that a first pair can be detached from the body 30 and are interchangeable with a second pair of detachable tips that has different dimensions than the first pair. For example, corresponding threading may be provided on each of the tips and/or the bodies 30 such that differently sized and/or differently shaped pairs of tips can be attached to the bodies 30 for use. The different dimensions and/or shapes of the first and second pairs may refer to the surface area of the tips, for example. In an embodiment, the surface area of one set of tips 32 is designed such that it may be placed on or adjacent to at least one set 68, 70, 72, or 74 of the suboccipital muscles 60. In another embodiment, the surface area of a set of tips 32 is designed such that it may be placed on or adjacent to at least two sets of the suboccipital muscles 60. In yet another embodiment, the surface area of a set of tips 32 is designed such that it may be placed on or adjacent to all sets of the suboccipital muscles 60.

Figure 34:
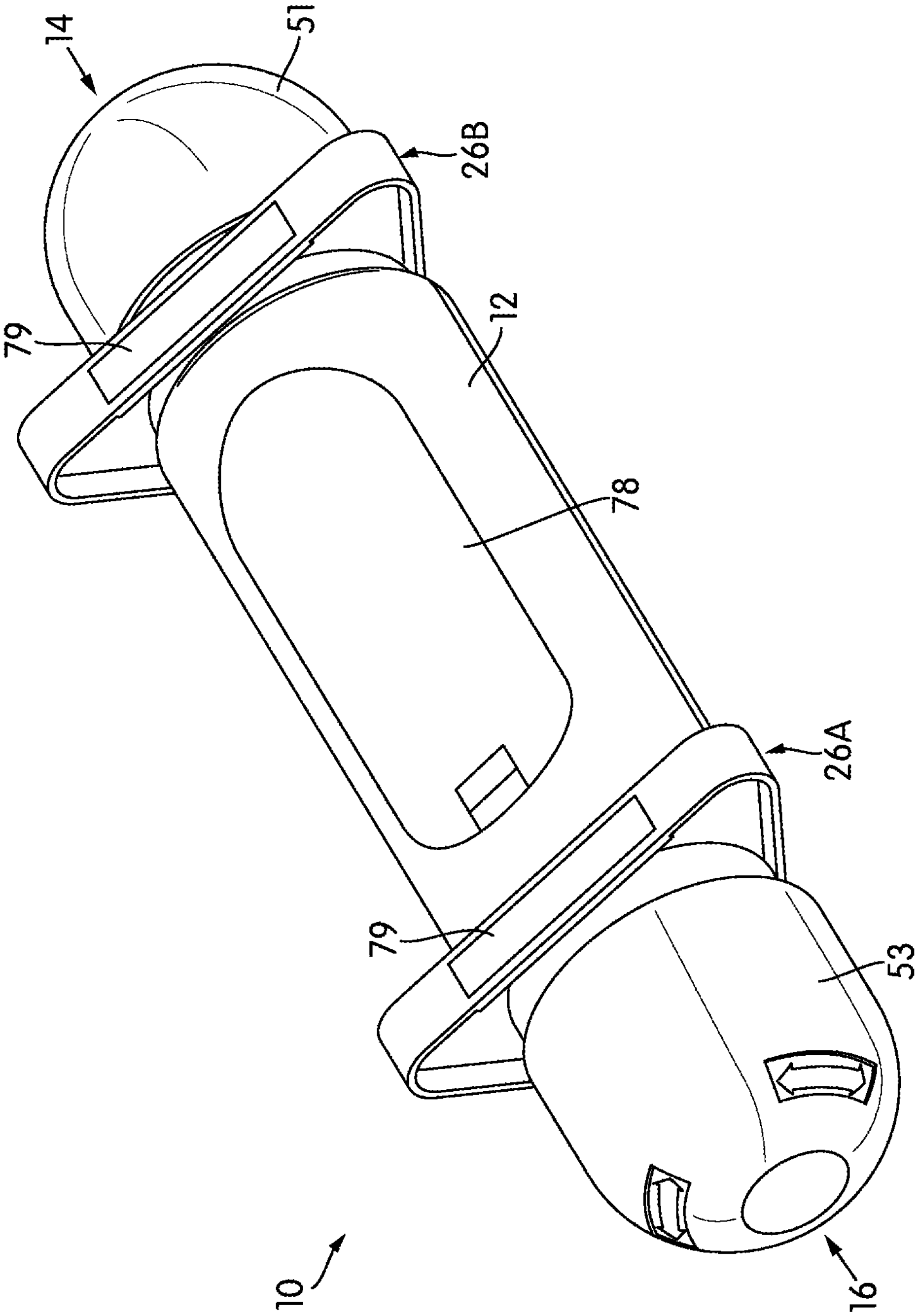

In one embodiment, a storage area or storage compartment is provided in the therapeutic device. As shown in FIG. 16, for example, a compartment 76 may be provided in a bottom portion of the body for storing different replaceable applicator tips/heads therein. The compartment 76 may include slots or indents for receipt of the tips or simply an area for receiving the tips 32 therein. A cover 78 may be provided for the storage compartment 76. The cover 78 may be removable or may be attached (e.g., hinged) in such a manner that the cover 78 may be moved to provide access to the inside of the compartment 76. FIG. 34 shows an another embodiment of a therapeutic device with a cover 78 over a storage compartment provided in a bottom portion of its body. Of course, a cover 78 need not be provided for the compartment 76 or tip receiving area of the body 12.

In an embodiment, the pressure applicators 28 may be designed to apply a collection of points of pressure to the suboccipital muscles 60. For example, tips 32 may be designed to include structures that extend to apply multiple points of pressure to the body.

In the illustrated embodiment of FIGS. 1-7, multiple pairs of feet 26 are provided on the body 12; specifically, three pairs of feet 26 are shown. The feet 26 assist in positioning the device 10 at an angle and to keep the body 12 from rolling once in place.

However, it should be noted that the feet 26 or stabilizing device used with therapeutic device 10 need not be limited to pairs of feet and instead a single stabilizing leg, stand, or foot may be provided or associated with the therapeutic device 10, in accordance with multiple embodiments. In some embodiments, more than two feet, i.e., three or more feet, may be provided as a set. Further, one pair/set, two pairs/sets or more than three pairs/sets of feet 26 or stands may be provided on the body 12. For example, in one embodiment, the feet 26 are provided in the form of bars that may extend along the length L of the body 12. In another embodiment, the feet 26 are provided in the form of stand portions 26A, 26B (discussed in greater detail below) that are spaced horizontally or longitudinally from each other and adjacent ends of the body 12, such as shown in FIGS. 15 and 20, for example. Accordingly, the illustrated embodiment is not limiting.

Figure 5:
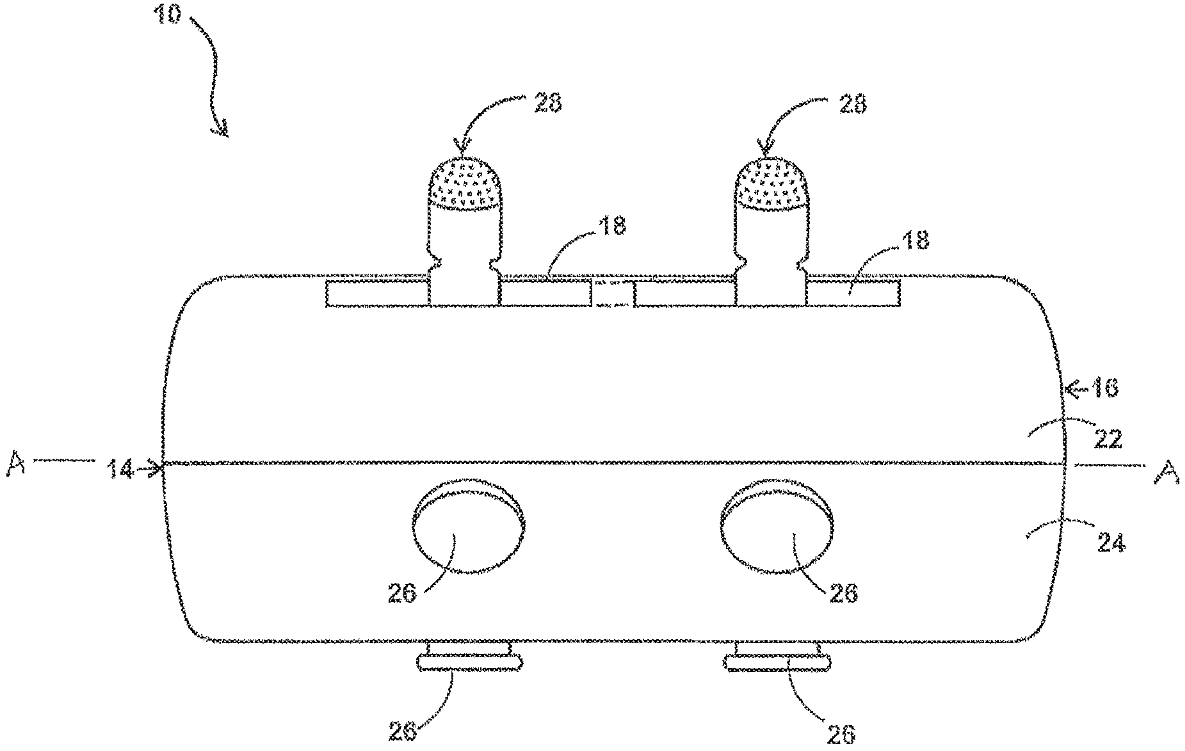
FIG. 5 is a back view of the therapeutic device of FIG. 1.
Figure 7:
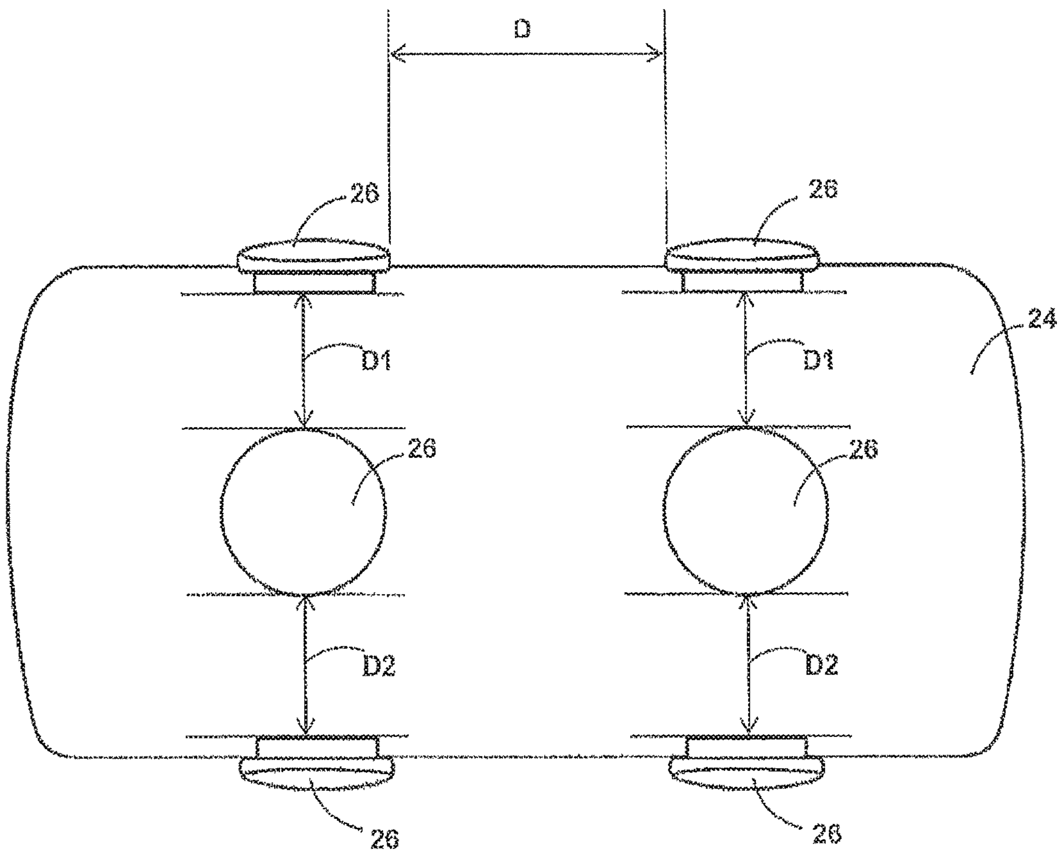
FIG. 7 is a bottom side view of the therapeutic device of FIG. 1.

Referring to FIG. 5 and FIG. 7, as shown, the pairs of feet 26 may be positioned around the generally tubular body in spaced relation to another pair, such that the body 12 may be positioned at different angles (e.g., on a floor). The feet 26 may have a flat portion or head thereon to increase stability during use of the therapeutic device 10. As shown in FIG. 7, each foot 26 in each of the pairs of feet 26 may be spaced from one another such that at a longitudinal distance D is provided between ends of the feet 26. In one embodiment, three (3) pairs of feet 26 are provided on the body 12. A second set of feet 26 (shown in the middle in FIG. 7) may be positioned a spaced distance D1 from a first set of feet 26 (shown at a top in FIG. 7), and a third set of feet (shown at a bottom in FIG. 7) may be positioned a distance D2 from the second set of feet 26. The pairs or sets of feet 26 may or may not be equidistantly spaced relative to one another. In an embodiment, distance D1 between sets of feet 26 is equal to distance D2 (D1=D2). In another embodiment, distance D1 is greater than distance D2 (D1>D2). In yet another embodiment, distance D1 is less than distance D2 (D1<D2).

In one embodiment, both D1 and D2 are approximately 1.0 inches.

In yet another embodiment, the feet 26 or the stabilizing device may be provided in the form of a pair of stand portions 26A, 26B, such as shown in FIGS. 15-16 and/or FIGS. 20-21, for example. The stand portions 26A, 26B may be positioned with the body, e.g., one at either end, to keep the body 12 from moving or rolling. In an embodiment, each of the stand portions 26A, 26B include at least one leg 27 that extends below the body 12 for positioning on a surface, e.g., floor. In one embodiment, each leg 27 extends from a side of the body 12 towards the surface. In another embodiment, such as shown in FIG. 16, the legs 27 are connected to each other via a connection portion 29 that has a flat surface for positioning on a surface/floor. The connection portion 29 may be positioned below the body 12 and extend between the legs on either side thereof. In another embodiment, the stand portions 26A and 26B have a solid portion (see, e.g., FIGS. 31-32) connecting or extending between legs 27 and portion 29, to provide further stability to the therapeutic device 10.

The stand portions 26A and 26B may be similar or the same in construction and may be attached to ends of the body 12 in a manner such that the rail 34 or rod extends through the stand portions 26A, 26B (see, e.g., FIG. 36 and FIG. 38A), so that its ends may be secured or connected within knobs 51, 53, for example, as described later.

In an embodiment, slip resistant devices 79 may be provided on the bottoms of the stand portions 26A, 26B, an example of which is shown in FIG. 34. The slip resistant devices 79 may be padding, non-skid material, or rubber feet, for example, that are attached (e.g., via adhesive) to the underside of the stand portions 26A, 26B or connection portion 29.

Figure 18:
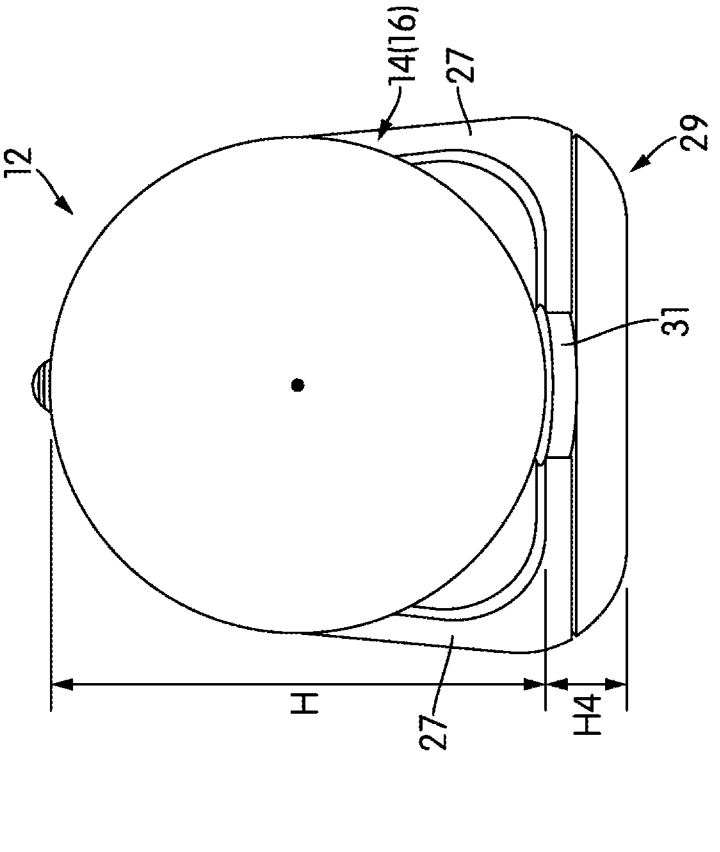

In one embodiment, the stand portions 26A, 26B may include an adjustment device for movement in the vertical direction, thereby providing further height adjustment of the therapeutic device via moving its body up and down (in addition to, or alternatively to, the height adjustment of the applicators). FIGS. 18 and 19 illustrate an example of one implementation of an adjustment device for altering the height of the body 12 relative to a surface (floor). Each connection portion 29 may be formed of two parts (e.g., a top part and a bottom part) connected by screws or legs. In a first position, such as shown in FIG. 18, the parts of the connection portion 29 are together. In the first position, the connection portion 29 has a height H4 measured between a top surface of the connection portion 29 (adjacent bottom surface of the body 12) and a bottom surface of the connection portion 29. Accordingly, the overall height of the therapeutic device equals H+H4 (not including the height of the applicators 28). To adjust the height of the stand portions 26A, 26B, the top and bottom parts may be moved away from each other. In one embodiment, an adjustment dial 31 for adjusting the height of the stand portions 26A, 26B may be positioned on or near the stand portions 26A, 26B. Rotation of the dial may cause rotation or movement of the screws or legs, thus moving the bottom part of the connection portion 29 away from the top part to one or more second positions, like the second position that shown in FIG. 19. In the second position, the connection portion 29 has a height H5 measured between a top surface of the connection portion 29 (adjacent bottom surface of the body 12) and a bottom surface of the connection portion 29, resulting in a height difference of ΔH. Accordingly, the overall height of the therapeutic device equals H+H5 (not including the height of the applicators 28), or H+H4+ΔH. The bottom part of the connection portion 29 may be moved to one or more second positions relative to the top part, and the height adjustment does not need to be limited to the two positions shown in FIGS. 18 and 19.

Alternatively, in another embodiment, the bottom part of the connection portion 29 may be pulled (by hand) away from its top part to extend the legs and bottom part.

Adjustment of the parts of therapeutic device 10 as described herein is not intended to be limited. The therapeutic device may be manually adjusted. For example, in an embodiment, a height and a relative width of the adjustable pressure applicators 28 is performed by hand. The body 12 itself may be rotated to a desired angle. In one embodiment, distinct stops are provided for rotating the body relative to the stand 26A, 26B.

FIGS. 21 and 22 show one embodiment wherein angular adjustment of the body 12 and pressure applicators 28 is performed by rotating the body 12 itself. The applicators 28 may be manually height adjustable and replaceable. In an embodiment, the height adjustment is based on a friction fit and detent stops. A relative width between the applicators 28 may be manually adjusted by sliding the applicators 28 along the rail 34, rod, or slide contained within the body 12.

In an embodiment, the applicators 28 may be rotated or twisted to a set height. For example, as shown in FIG. 25, the tips 32 of the applicators 28 may be connected to their bodies via female and male screw portions, wherein the tips 32 are turned to move them up and down. The screw portions also allow for tip replacement.

The applicators 28 may be manually width adjustable and friction fit. In an embodiment, the relative width of the applicators 28 is adjusted using a handle, a dial portion, or a knob (e.g., knob 53) provided on the body 12. For example, as shown in FIG. 25, an end (14 or 16) of the body may include a dial or knob 53 with an associated adjustment portion (e.g., screw) on a rod that cooperates with a body 30 of an applicator 28. As the knob 53 is rotated, it simultaneously rotates the attached adjustment portion, which in turn may adjust the location of the body 30 of the applicator along axis A-A (and, in some cases, its position relative to the other applicator 28), thereby moving the applicator 28 horizontally along axis A-A (e.g., relative to the other applicator). FIG. 29 shows yet another embodiment that includes a dial or knob 53 for width adjustment having an associated adjustment portion in the form of a screw.

In accordance with embodiments, the knob 51 may be provided on the body 12 for angular adjustment about axis A-A (e.g., relative to the stand 26A, 26B). One example of providing knob 51 on an opposite end of the body 12 has been previously described above with reference to FIG. 14, for example. In the illustrated embodiment of FIG. 29, the knob 51 is provided on the same side as knob 53, but positioned such that it surrounds a portion of knob 53. The knob 51 may be rotated, e.g., using detent stops, to different positions to adjust the angle of the body 12 about axis A-A. In an embodiment, the body 12 may be locked in a desired angled position. For example, each detent stop (not shown) may act as a lock so that the body 12 may be placed, secured, or locked—at least temporarily—in a desired angular position. In an embodiment, the body 12 may be moved between pre-defined positions relative to a surface. In one embodiment, the body 12 may be locked or secured in position via friction fitting elements.

Figure 31:
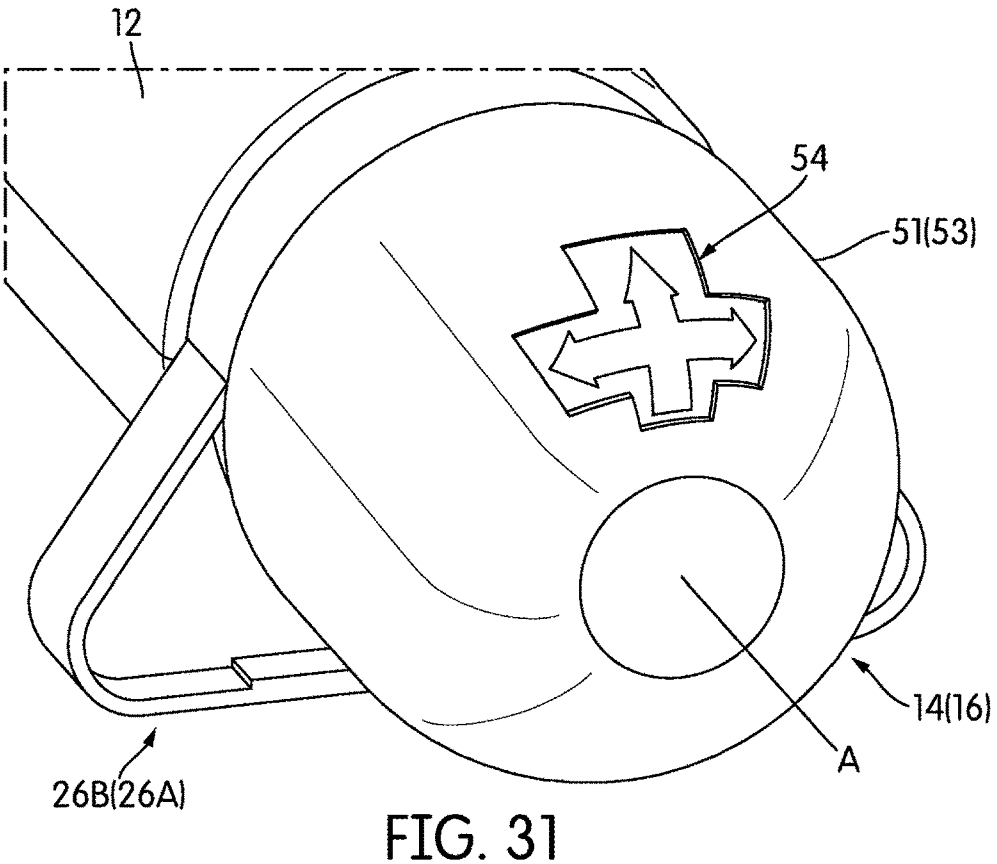
FIGS. 31 and 32 are end views of a therapeutic device in accordance with an embodiment having optional indicator portions.
Figure 32:
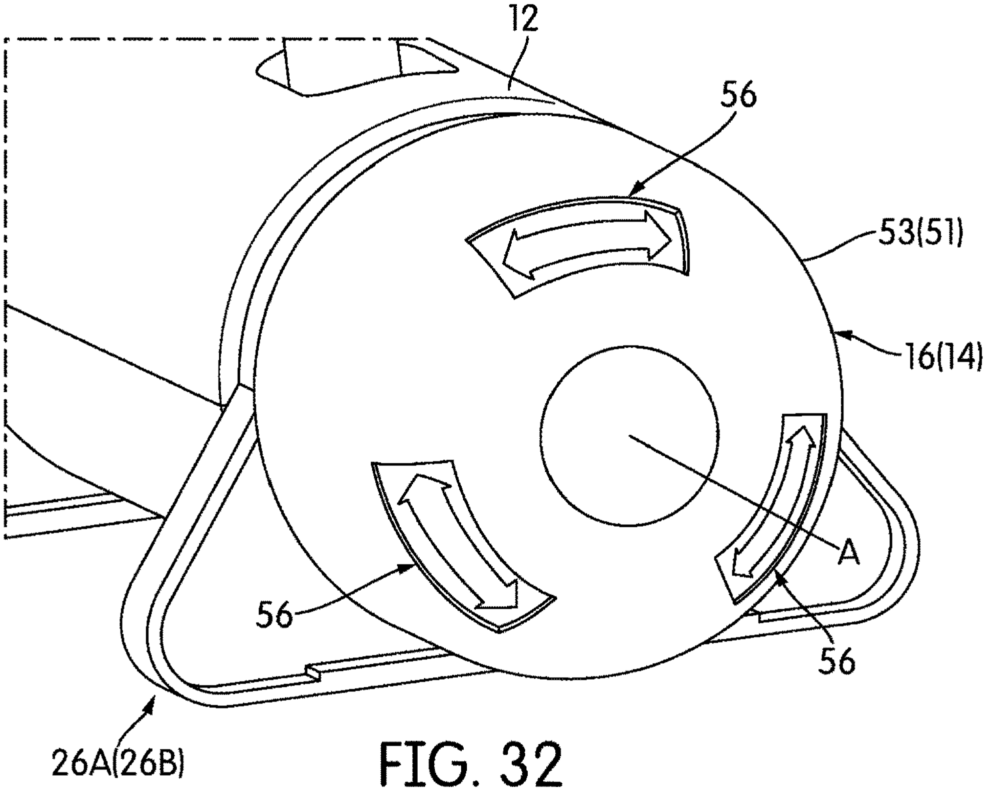

In embodiments, either or both of the knobs 51, 53 may be optionally provided with indicator portions, such as shown in FIGS. 31 and 32. For example, FIG. 31 shows an area 54 with arrows therein illustrating the movement of knob 51 for providing adjustment to parts (e.g., angular adjustment of the applicators 28) of the therapeutic device 10. Similarly, FIG. 32 shows multiple areas 56 placed around its body with arrows therein, illustrating the movement of knob 53 for providing adjustment of parts (e.g., translational or relative movement of the applicators 28 in the slots 18) of the therapeutic device 10. Each area 54, 56 may be provided in the form of a recess in the knob 51, 53, for example. The areas and/or indicators (e.g., arrows) may be provided on the knobs 51, 53 in any manner, e.g., labels, paint, molded, etc., and are not intended to be limiting.

Additionally, the knobs 51, 53 may have ribbing or textural portions thereon to assist a user when gripping the knobs 51, 53 and moving them for adjustment of the parts of the therapeutic device. The placement and design of the ribbing or texture on the knobs 51, 53 should not be limited.

However, it should be noted that a knob is not required to adjust or move the body 12. The body 12 itself may be rotated (e.g., by hand, forwards or backwards) about axis A-A, to one or more different positions. Also, the positions for placement of the body 12 (and thus an angle of the applicators 28) may or may not be preset, e.g., via detents. The position of the body 12 (and applicators 28) about axis A-A may be secured by any number of devices and is not intended to be limited. In accordance with an embodiment, the body 12 is configured such that each user may rotate the body 12 about its axis A-A and stabilize the body 12 and applicators 28 at a desired angle (relative to axis A-A). The body 12 and applicators 28 may be positioned based on personal preference with regards to comfort and placement of the applicators 28 and body 12 relative to a user's body part. Accordingly, the therapeutic device 10 allows for each user to position the device such that it is most comfortable and effective during use.

FIG. 30 shows yet another embodiment having manually height adjustable and replaceable applicators, wherein the height is adjustable via a screw portion. An outer knob 51 having detent stops is provided for angle adjustment on the end of the body 12, and an inner knob 53 with a screw portion is provided for relative width adjustment of the applicators 28 (both of which were previously described).

Figure 33:
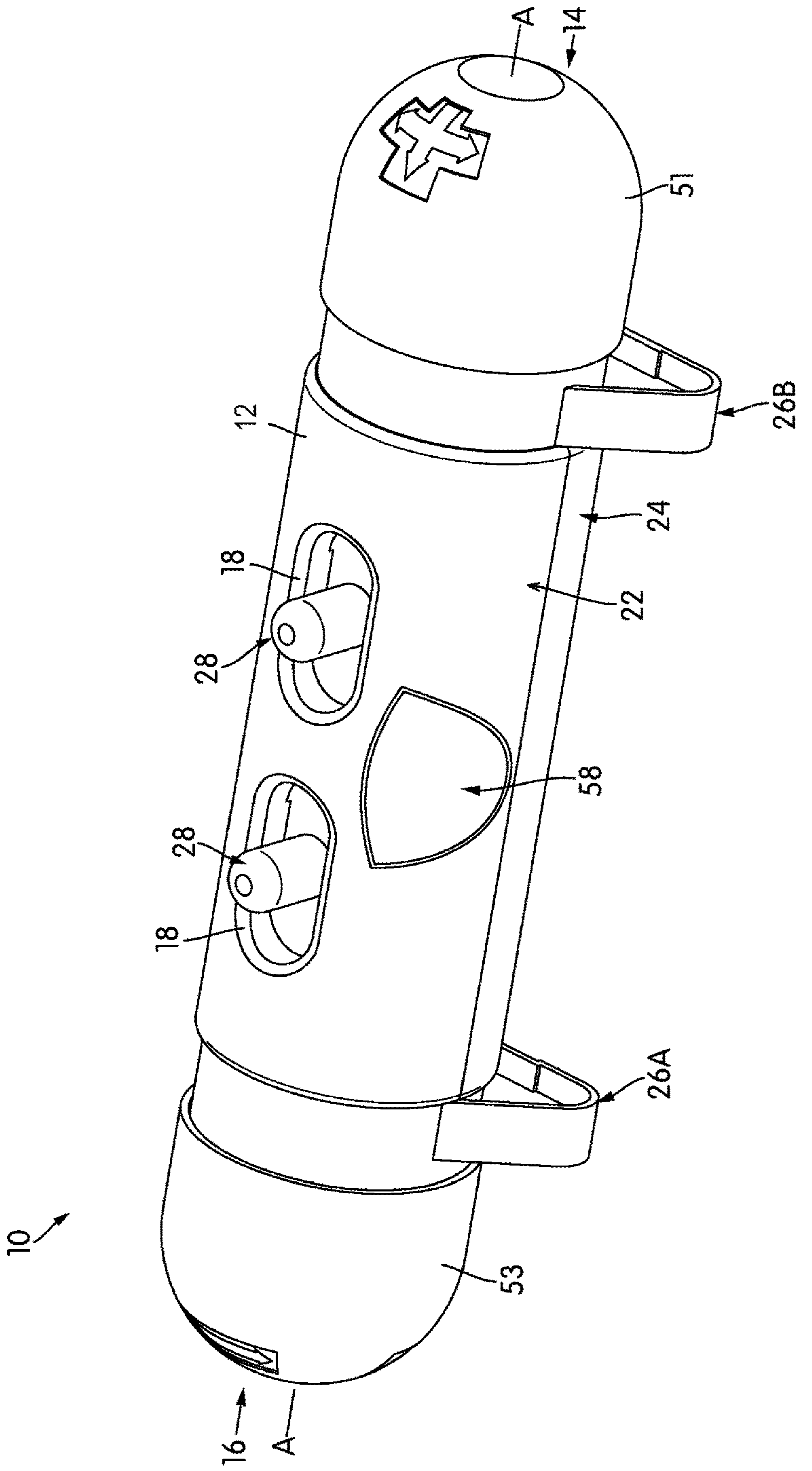
FIGS. 33 and 34 are top and bottom perspective views, respectively, of a therapeutic device in accordance with another embodiment.
Figure 36:
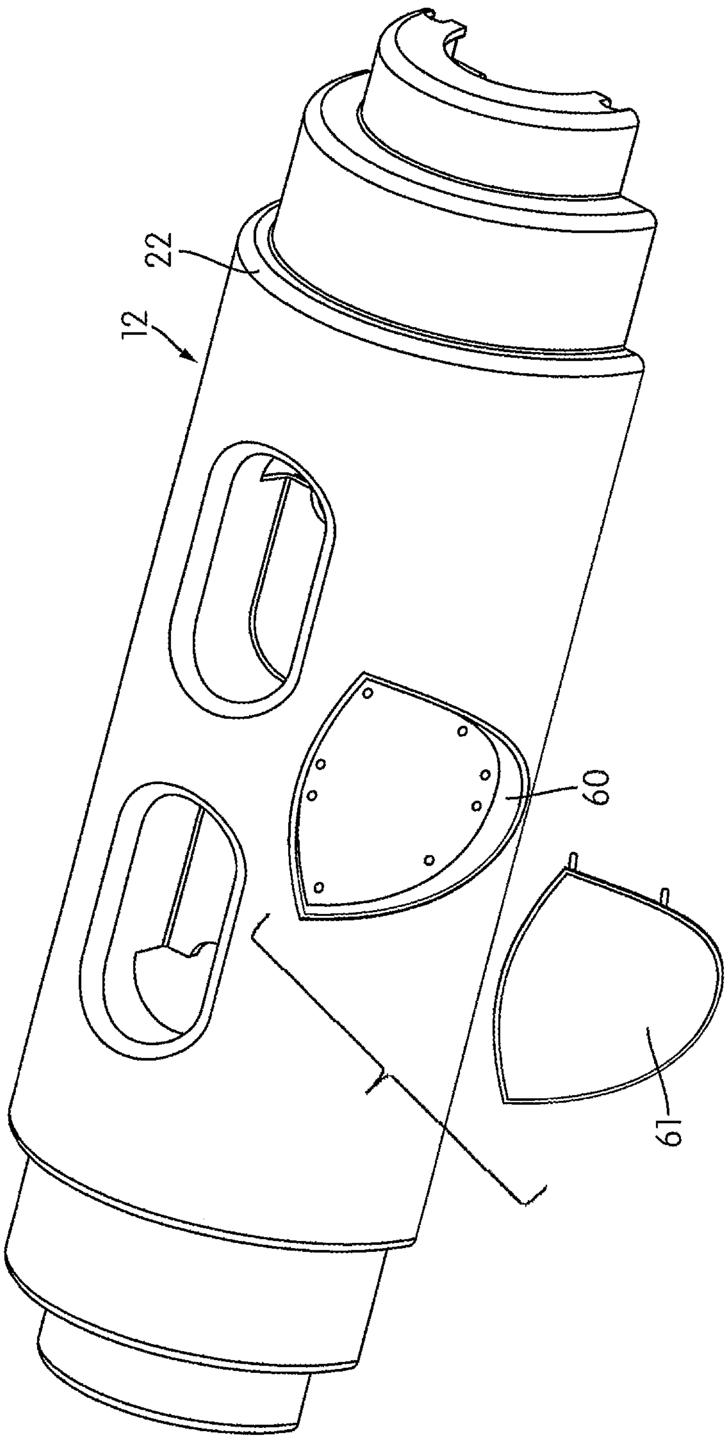
FIG. 36 illustrates a portion of a body of the therapeutic device shown in FIG. 34 with a partially exploded view of a pad portion provided in the body.

FIG. 33 shows another embodiment of a therapeutic device 10 that includes a pad portion 58 or cushion portion within its body 12. The pad portion 58 may include a curved and/or concave configuration such that it provides more clearance for a user's vertebrae when using the device 10, allowing for a better and more comfortable experience. As shown in FIG. 36, for example, the first (top) half piece 22 of the body 12 may have an indentation 60 or receiving area that extends into the body 12 (e.g., it may be molded therein). An insert 61 is assembled with, inserted into, and/or secured within the indentation 60 to form the pad portion 58. In accordance with an embodiment, the insert 61 is formed from a material that is softer than the material used to form the body 12. For example, the insert 61 may be formed from thermoplastic rubber. The insert 61 may be assembled and/or overmolded into the indentation 60 of the plastic/molded piece 22 of the body 12, for example. The method of attachment or securement of the insert 61 is not intended to be limited. In addition, the shape of the pad portion 58, indentation 60, and/or insert 61 as illustrated in the Figures is also not intended to be limiting. Although shown in the Figures as being on one side (e.g., the front side) of the body 12, in accordance with an embodiment, a pad portion 58 may be provided on either side of the body 12. Moreover, although not explicitly illustrated, any of the previously described embodiments may include a pad portion 58.

Figure 38A:
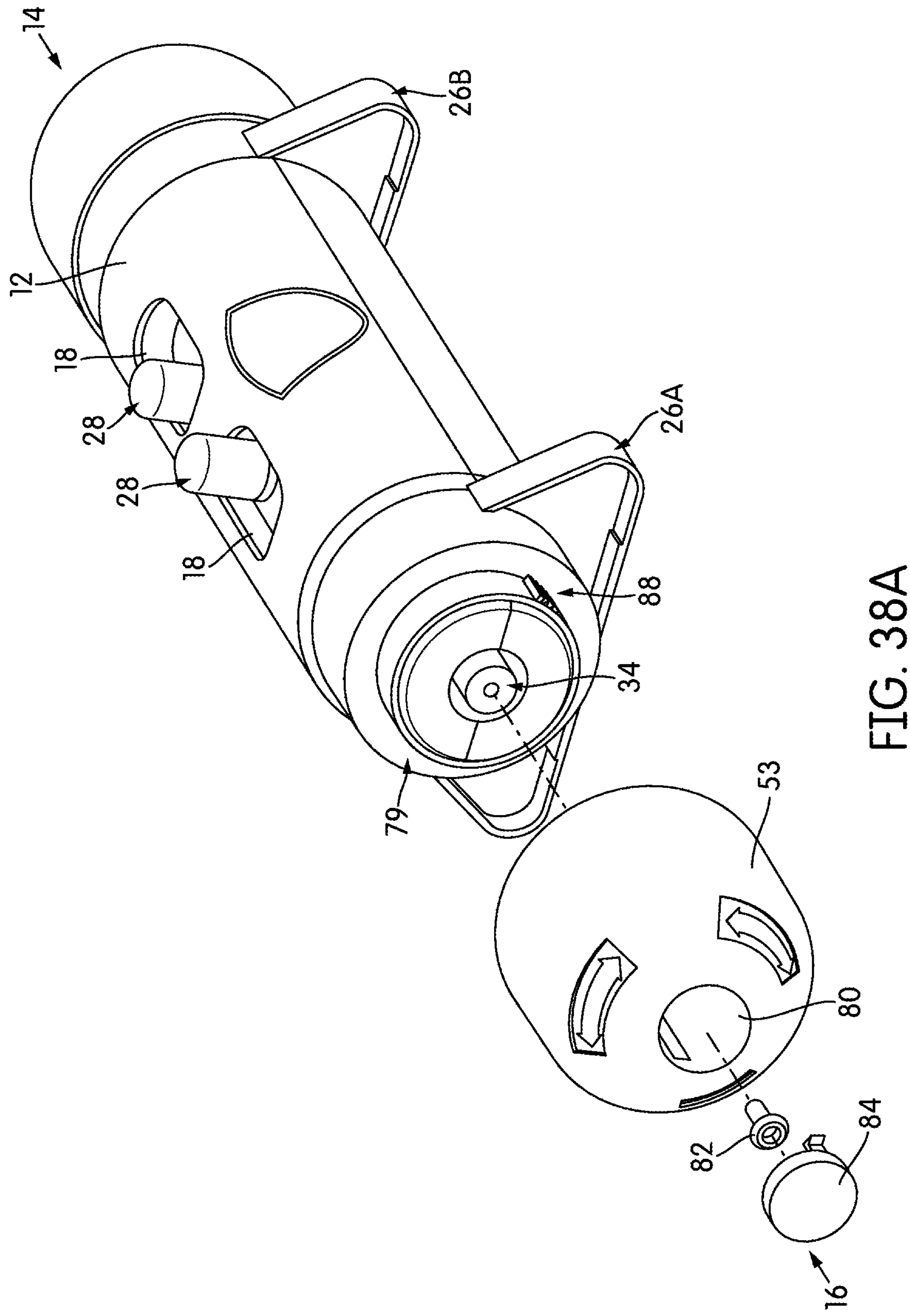
FIG. 38A is a first end perspective view of the therapeutic device of FIG. 34 with a partially exploded view of end parts for adjustment in accordance with an embodiment.

In one embodiment, knob 53 in FIG. 38A acts as a translation endcap for applicator movement and translation along axis A-A, so that the width/length of the pressure applicators 28 is relatively adjusted. As shown in FIG. 38A, for example, an end portion of the rod 34 extends through an end 79 of the stand portion 26A. The knob 53 may be aligned with end 79 and positioned against the stand portion 26A. In an embodiment, the end of the shaft 34 has a flat on it which mates with a corresponding flat provided within a receiving area of the knob 53. The knob 53 has a central opening therein through which a screw 82 or fastener is inserted and secured so that it holds the knob 53 onto the end of the shaft 34. A cap 84 may be used for decorative purposes, e.g., to cover the central opening and hide the head of the screw or fastener after is it secured. To adjust the pressure applicators 28, the knob 53 is rotated about axis A-A (in either direction). Rotation of the knob 53 causes the pressure applicators 28 to translate in and out within their slots 18, relative to one another. Rotation in one direction, e.g., counterclockwise, causes relative inward movement of the applicators 28 (i.e., movement of the applicators linearly or longitudinally along axis A-A towards each other), while reversing the direction of rotation, e.g., clockwise, causes relative outward movement of the applicators 28 (i.e., movement of the applicators linearly or longitudinally along axis A-A away from each other).

Figure 37:
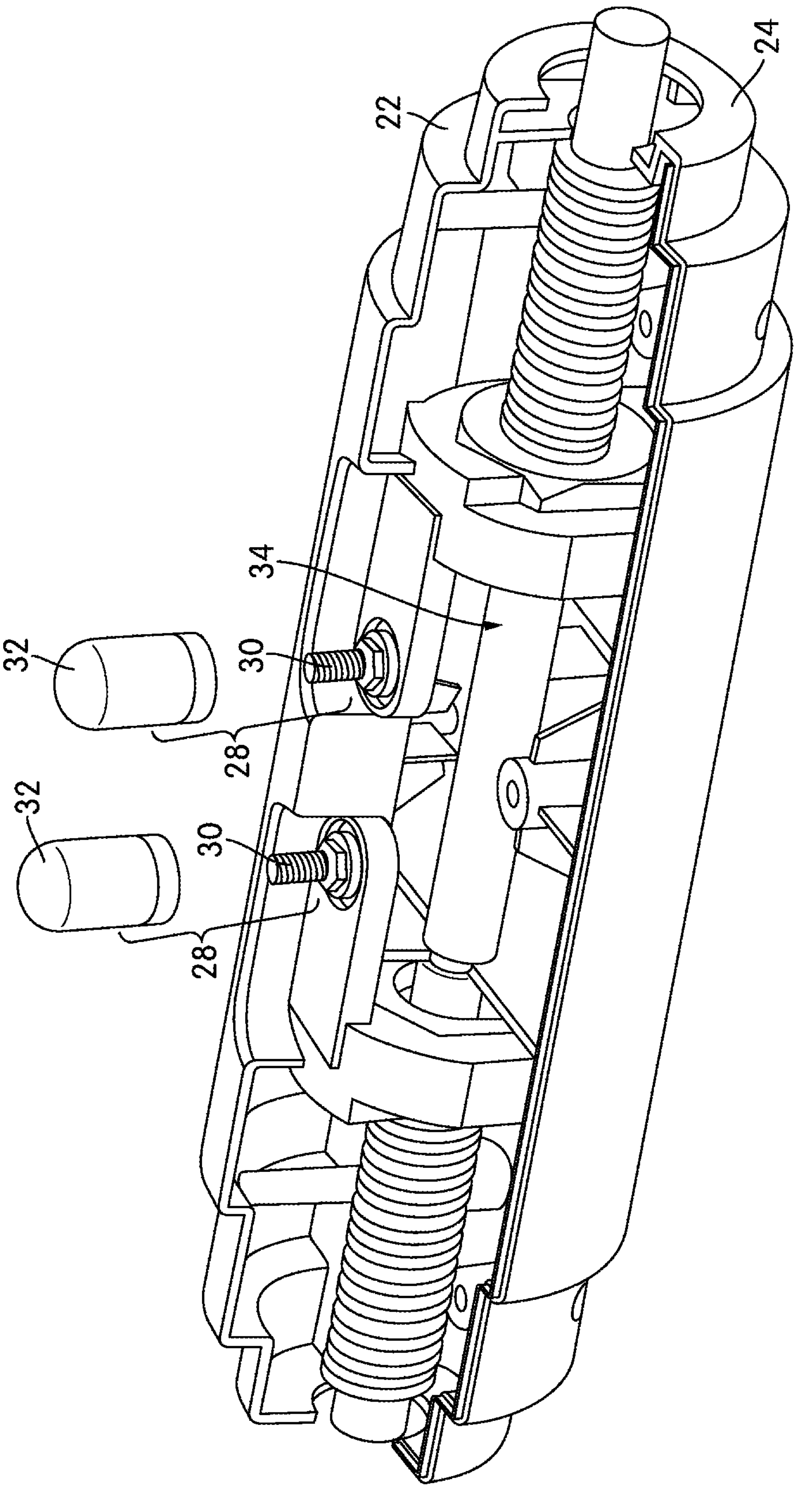
FIG. 37 is a partial cross sectional view of the therapeutic device of FIG. 34 showing an example of adjustment features in accordance with an embodiment.

When the end of shaft 34 at the end 79 is moved or driven as described above with reference to FIG. 38A, the other end of the shaft 34 is configured to rotate freely (e.g., within knob 51). As shown in FIG. 37, for example (which is a partial cross sectional view of the therapeutic device 10 of FIG. 33, wherein part of the (top) half piece 22 is cut away for illustrative purposes), the shaft 34 can be secured or trapped between the two half pieces 22 and 24. Additional details of these adjustment features or parts may be further viewed in the exploded view of FIG. 35. The rail 34 or rod or shaft extends through the body 12, as previously described. The rail 34 may include threads or screw portions on each side, e.g., left hand threads on one side and right hand threads on the other. Brackets 96 are secured to the rail 34, e.g., closer to a center portion thereof and axially inward of the threads (closer towards a center of the rail 34), using nuts 98. The nuts 98 are fit into openings (see FIG. 35) of the brackets 96, for example, and screwed onto threads of each side. The brackets 96 may have a leg portion that, when the device 10 is assembled, are positioned horizontally or longitudinally and parallel to the rail 34. The leg portion may have a hole therein through which screws may be inserted. In an embodiment, the screws act as body portions 30 for each of the tips 32 of the pressure applicators 28 (e.g., see FIG. 37). Alternatively, as shown in FIG. 35, the screws may connect to other devices, that the tips 32 are then attached to. The nuts 98 and brackets 96 are configured to move longitudinally and relatively along the threads/screw portions of the rail 34 when the knob 53 is turned or rotated. As such, the brackets 96 and nuts 98 act as the devices for translationally and relatively moving the applicators 28 along the axis A-A within their slots 18.

In one embodiment, the pressure applicators 28 include thread inserts assembled therein (e.g., see parts shown in FIGS. 35 and 37) which allows the tips 32 to be screwed onto the screw (30) of the arm. Adjustment of the height of the applicators 28 may be performed manually, then, by turning at least the tip 32 to the desired height.

Figure 38B:
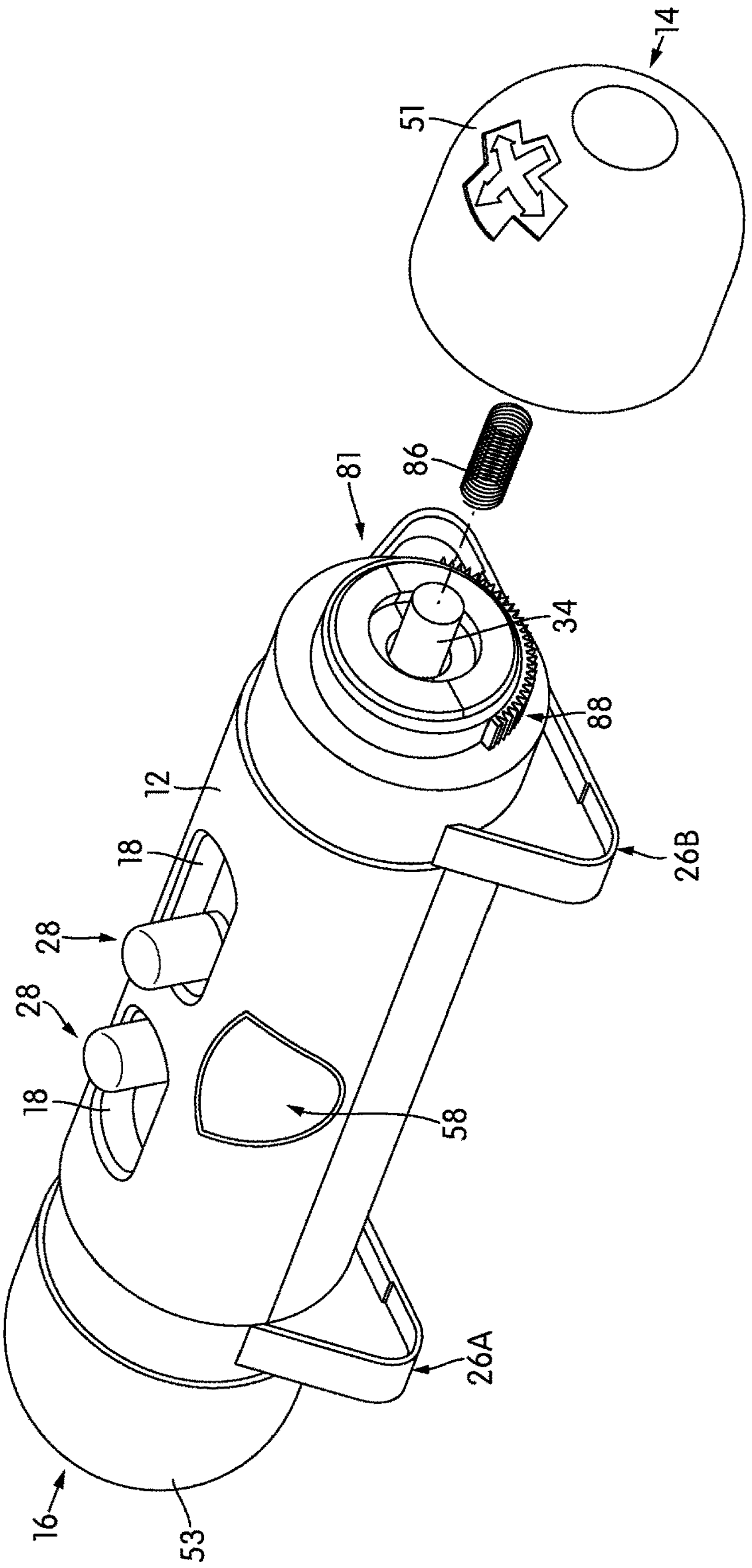
FIG. 38B is a second or alternate end perspective view of the therapeutic device of FIG. 34 with a partially exploded view of end parts for adjustment on an opposite side of the device in accordance with an embodiment.
Figure 38C:
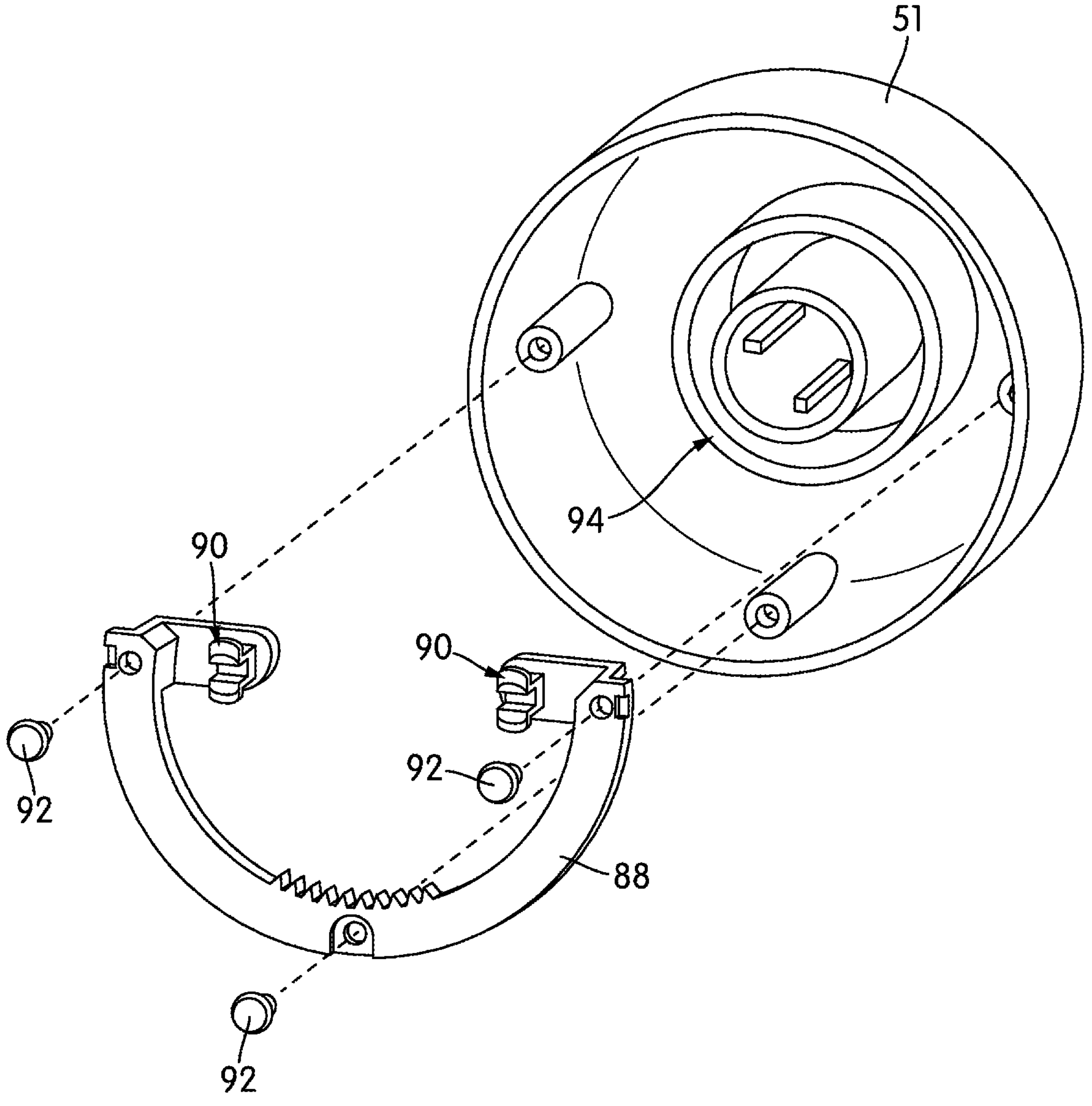
FIG. 38C illustrates a detailed view of parts used on the end as shown in FIG. 38A.

FIG. 38B illustrates an opposite end of the therapeutic device of FIG. 33 wherein knob 51 is assembled on an end 81 of stand portion 26B (stand portions 26A and 26B may be similar in design and configuration). The other end of the shaft 34 may extend through the body 12 and stand portion 26B such that knob 51 may be connected thereto. The knob 51 may be spring loaded to the end of shaft 34 by placing spring 86 within the knob 51. The knob 51 may be aligned with end 81 and positioned against the stand portion 26B. In an embodiment, the end of the shaft 34 and spring 86 mate with a connector 94 (see FIG. 38C) provided within a receiving area of the knob 51.

In addition, the end 81 may include an adjustment (gear) mechanism 88 for rotationally adjusting the body 12, in accordance with an embodiment. The adjustment mechanism 88 may include gear teeth 87 provided on a flange at the end 87 of stand portion 26A, for example, and a sector gear 89, shown in greater detail in FIG. 38C, that mates therewith. The sector gear 89 may be half-moon shaped and includes teeth that mate with the gear teeth 87 when assembled, for example, and holds body 12 in position about axis A-A. Screws 92 are positioned through holes in the sector gear 89 and screwed into corresponding receiving holes provided in the receiving area of the knob 51, thus securing gear 89 to the knob 51. Retaining posts 90 or tabs are provided at the ends of the sector gear 89, e.g., to eliminate breaking. The retaining posts 90 are configured to act as linear guides when the knob (51) is pushed longitudinally along axis A-A to compress the spring 86.

Figure 39:
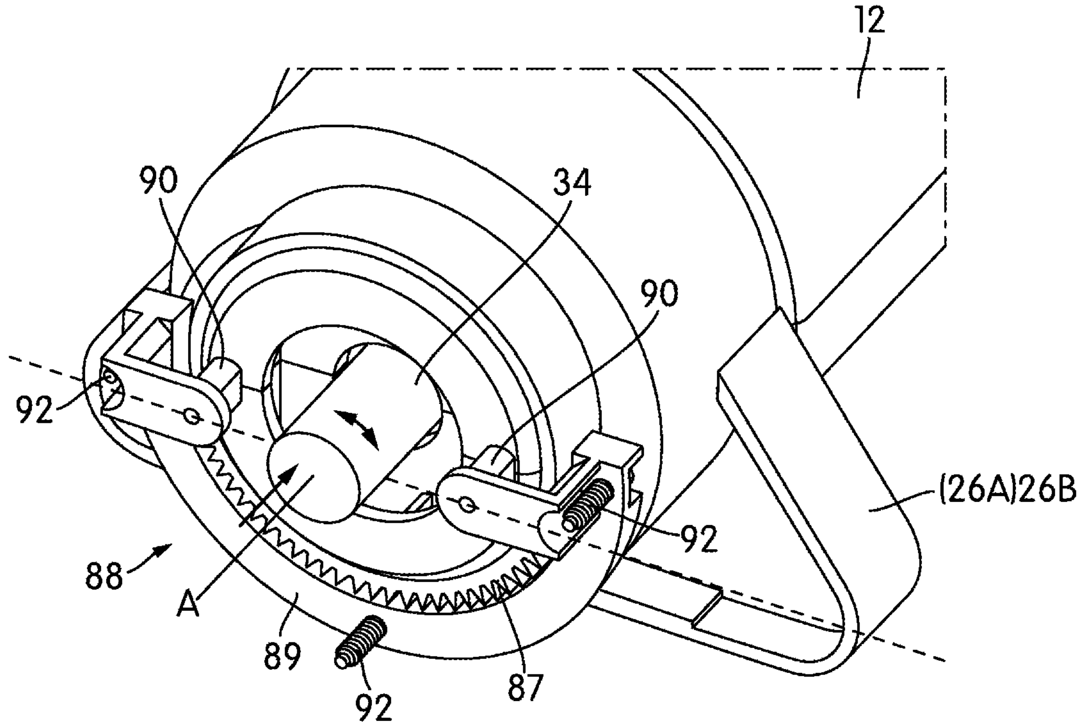
FIGS. 39 and 40 shows end views of the therapeutic device of FIG. 34, with its adjustment knob removed therefrom, illustrating movement of a gear mechanism used for adjustment in accordance with an embodiment.
Figure 40:
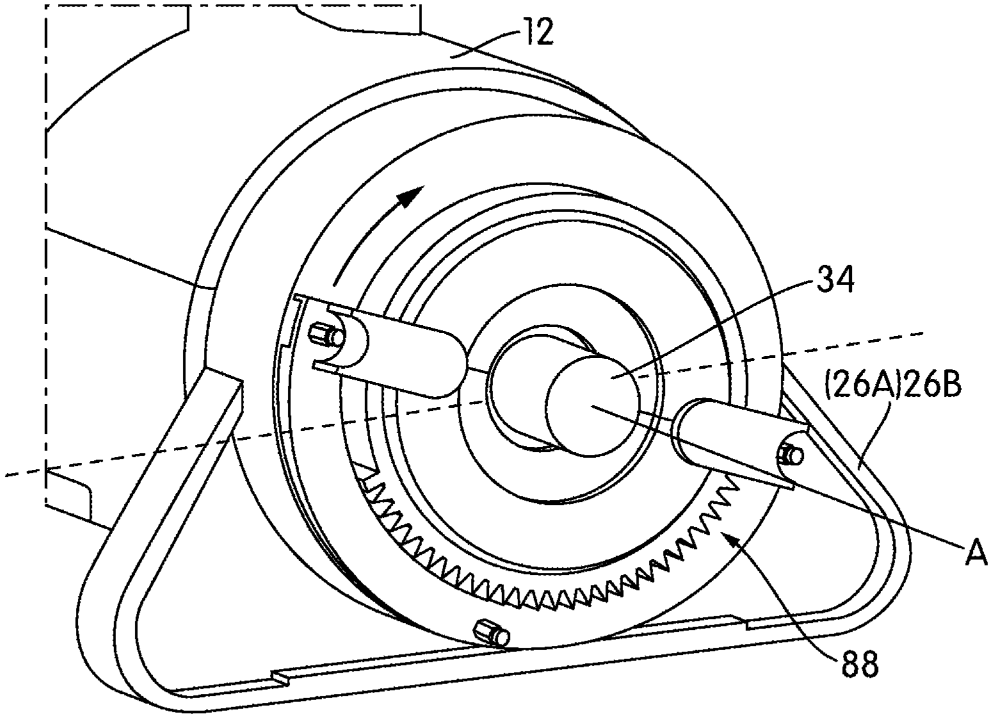

FIGS. 39 and 40 shows end views of the therapeutic device of FIG. 33, with its adjustment knob 51 and spring 86 removed therefrom, illustrating movement of the parts of adjustment mechanism 88. Specifically, in the rest position, such as shown in FIG. 39, the posts 90 act as an end travel stop. Teeth of the sector gear 89 are engaged (at the bottom) with the gear teeth 87 on stand portion 26B, holding body 12 in its rotational position. To adjust the body 12 about axis A-A, the knob 51 is pushed in along axis A-A. This disengages gear teeth provided on the sector gear 89 from gear teeth 87, and allows the entire body 12 to rotate (e.g., as viewed here in FIG. 40, rotated towards the back or in a clockwise direction about axis A-A, but it may also be turned towards the front or counterclockwise) to a desired angle, e.g., such that the pressure applicators 28 and pad portion 58 are positioned at a desired angle for the user. When the knob 51 is released, the teeth of sector gear 89 re-engage with the gear teeth 87 to hold the body 12 in its rotated position.

Optionally, one or more parts of mechanism 88 may also be provided on the end 79 of the stand portion 26A and/or within the knob 53 (see FIG. 38A), but provide no function.

Although different adjustment devices, knobs, and parts have been shown in the above-noted Figures, the illustrations as shown are not intended to be limiting. That is, the features described in each of the embodiments may be interchanged and/or used with other embodiments than those they are shown and/or described with reference to.

Figure 12:
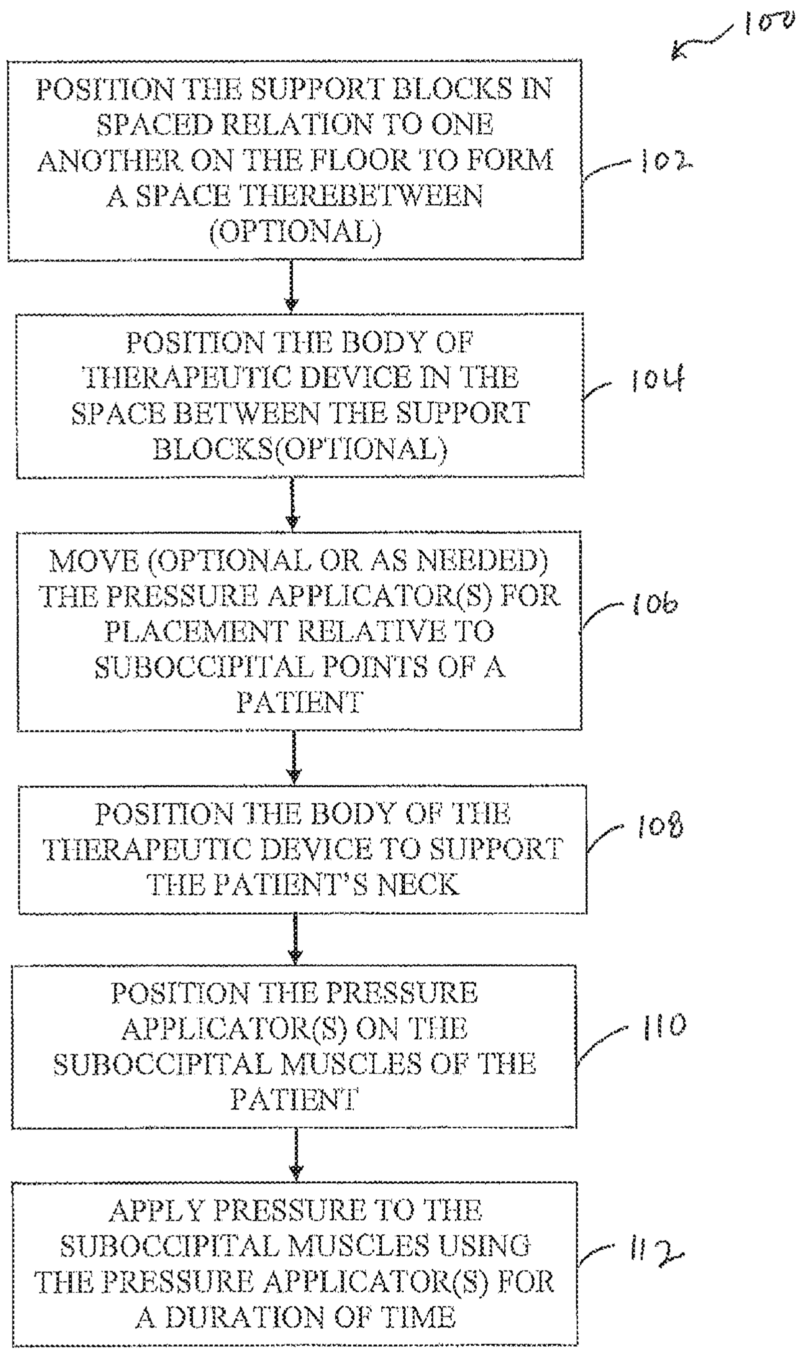
FIG. 12 is an exemplary method for using the therapeutic device of FIG. 1 for treatment of pain.
Figure 13A:
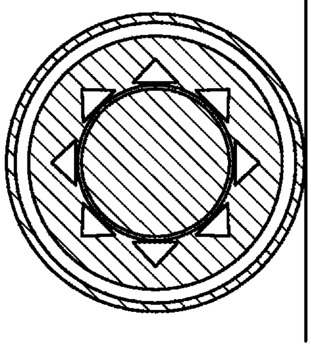
FIGS. 13A-13D illustrate examples of shapes that may be used to form a body of the therapeutic device, in accordance with embodiments.
Figure 13B:
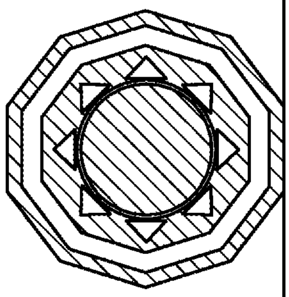
Figure 13C:
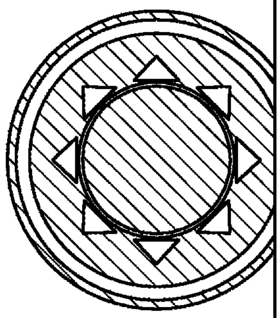
Figure 13D:
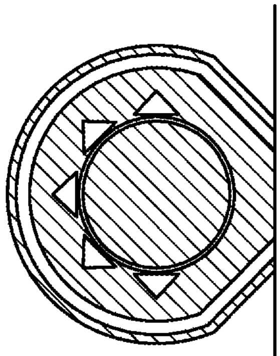

FIG. 12 shows steps of a method 100 for using the therapeutic device 10 for treatment of pain, such as to treat headaches or migraines, by placement on or adjacent to the suboccipital muscles 60 (see FIG. 10). As previously noted, one of ordinary skill recognizes that these muscles are located at the back of the neck near the base of the skull, as generally shown in FIG. 10. In order to stabilize the positioning of the therapeutic device 10 for placement on or adjacent to their suboccipital muscles, a patient may lay down to use the therapeutic device 10. This allows both gravity and the weight of the head & neck to work for the patient. Further the body 12 may compensate and self-adjust when pressure is being applied to the base of the skull and neck in such a position.

Figure 8:
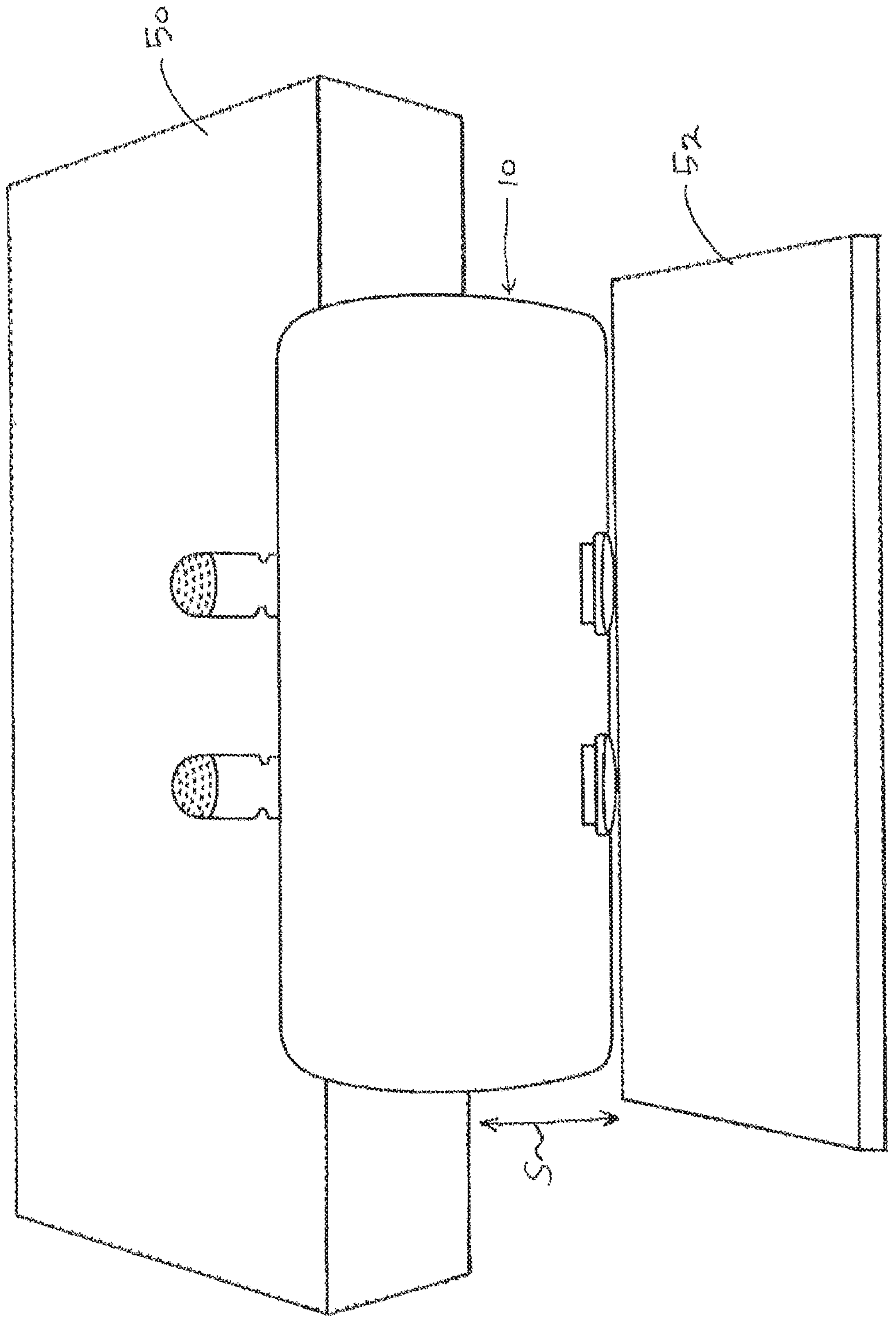
FIG. 8 is a side view of the therapeutic device of FIG. 1 configured for use.
Figure 11:
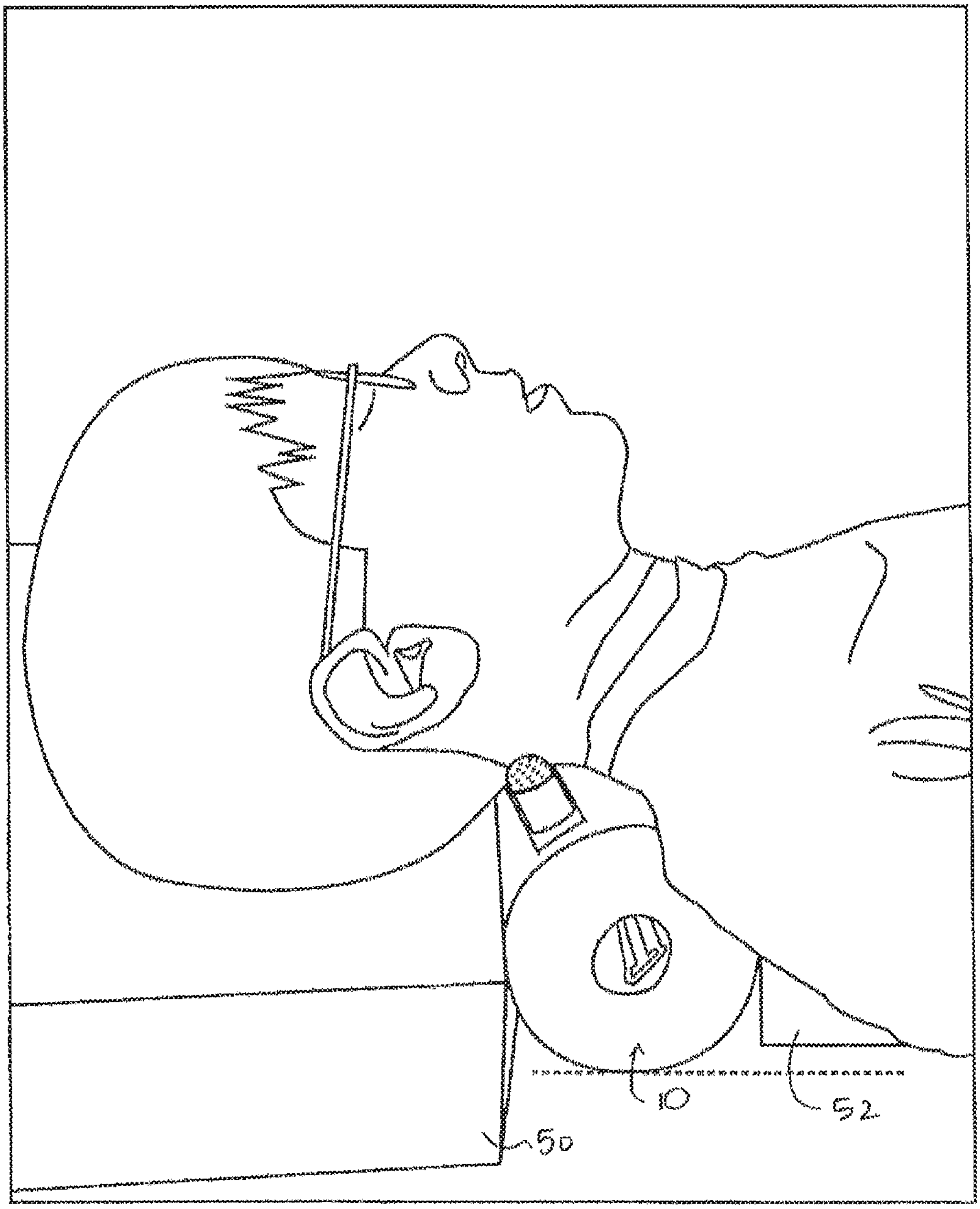
FIG. 11 illustrates an example of the therapeutic device of FIG. 1 in use.

In an embodiment, a support structure may optionally be provided along with the therapeutic device 10, to assist in positioning the device 10 and optionally provide comfort to the user/patient. In one embodiment, the support structure is provided in the form of one or more support blocks 50 and/or 52, which are shown in FIG. 8. However, this is not intended to be limiting. That is, the support structure may include one or more structures to provide support. The support block(s) 50 and/or 52 may be used to both assist in the positioning of the therapeutic device 10, as well as provide support for a patient's head, neck, and shoulders during use (e.g., when laying down), which is generally depicted in FIG. 11.

Accordingly, when one or more support structures such as support blocks 50 and 52 are provided with the therapeutic device, the method 100 may include positioning the body 12 of the device 10 against the support block(s). As shown at step 102 in FIG. 12, for example, the method may include positioning the support blocks in spaced relation to one another, e.g., on the floor to form a space S therebetween (see FIG. 8). Then, the body 12 of the therapeutic device may be placed or positioned as shown at step 104 in the space S between the support blocks 50 and 52, as shown in FIG. 8.

In another embodiment, the stand portions 26A and 26B are positioned on a surface (e.g., floor) and stabilized in order to stabilize the body 12.

At step 106, the first and second pressure applicators 28 may be moved for placement relative to suboccipital muscles or application points of the patient, e.g., moved translationally or vertically, e.g., using any one of the previously described devices or methods shown in the Figures. Then, at step 108, the body 12 of the therapeutic device 10 is positioned to support the patient's neck. For example, the body 12 may be positioned at an angle relative to the suboccipital muscles and neck. The body 12 may be rotated within the space S. In another embodiment, the body 12 may be rotated relative to stand portions 26A, 26B. In an embodiment, the feet 26 may be used to assist in stabilizing the body 12 within the space S and at an angle relative to the user.

Then, at step 110, the pressure applicators 28 may be positioned on or adjacent to the suboccipital muscles of the patient. For example, the patient may lie down such that his head is supported by the support block 50 and the device 10 is positioned at the neck. In another embodiment, a user's head is supported by the pad portion 58 and body 12. The device 10 may be rotated or adjusted to move the pressure applicators 28 onto application points for positioning on or near the suboccipital muscles. Optionally, the pressure applicators 28 may be further moved relative to one another when the patient is lying down to ensure proper application of pressure to the suboccipital muscle points.

The movement of the pressure applicators 28 may take place before or after the patient has lain down on the supports 50, 52 or the surface. In an embodiment, the pressure applicators 28 are moved linearly, translationally, vertically, angularly, and/or in the longitudinal direction relative to one another or via adjustment of the body 12 or stand portions 26A, 26B, e.g., using one or more of the previously described mechanical and functional devices shown in FIGS. 1-10 and 12-30.

Once the pressure applicators are aligned, they are used as shown at 112 to apply pressure to the suboccipital muscles for a duration of time. FIG. 11 illustrates an example of the therapeutic device 10 of FIG. 1 in use. The duration of time for applying the pressure may be based on the patient's preference. In an embodiment, the duration of time for applying pressure and using the device 10 is less than or equal to approximately fifteen minutes. In one embodiment, the duration of time for applying pressure and using the device 10 is less than ten minutes. In an embodiment, the duration of time for applying pressure and using the device 10 is less than or equal to approximately six minutes. In another embodiment, the duration of time is approximately 2 minutes to approximately 4 minutes. In yet another embodiment, the duration of time is approximately 3 minutes to approximately 5 minutes.

In an embodiment wherein interchangeable tips 32 are provided, the user may opt to change the tip of each of the first and second pressure applicators before the positioning of the therapeutic device 10 for use.

As understood by this disclosure, then, the herein disclosed therapeutic device(s) 10 and method 100 of use provides several improvements over known methods for treatment of headaches and migraines. It is a self-serve acupressure device that allows a user to apply pressure to the suboccipital muscles to relieve headache pain. The device 10 is adjustable with respect to width of each patient's neck and head size, allowing it to be fit to size and to apply pressure to the precise locations of the suboccipital muscles. It applies a firm amount of localized pressure to the noted area while still providing support and comfort to a user's neck.

Due to its portability, it may be used at any time or location, and provides quick, impactful relief. Use of the device is convenient, easy-to-use, and does not require a professional or a third party to assist in treatment. It may provide near-immediate relief in several minutes, as compared to medicine which typically takes at least 15-20 minutes to take effect.

Further, in addition to use for relieving present headaches, the therapeutic device 10 and disclosed method 100 may also be used for headache prevention. For example, a patient may use the device 10 once or twice a day (e.g., morning and evening), to assist in preventing the onset of headaches.

Moreover, it should be noted that although the device 10 and method 100 disclosed herein is described with reference to applying pressure to the suboccipital muscles for headache/migraine relief, it should be understood that it is also possible to use the device 10 and method 100 for other muscles/locations along the body to achieve therapeutic, acupressure relief and/or effect with regards to chronic pains. For example, the disclosed device may be used to apply localized pressure to other areas of the body to treat, reduce, and/or prevent pain. In one exemplary embodiment, the applicators and device may be positioned on a patient's back to apply pressure and relieve upper back tension and/or lower back tension. Other exemplary areas to utilize the device and pressure applicator(s) include a patient's shoulders, hips, sides, backside (e.g., to treat sciatica), and legs.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, in an embodiment, the pressure applicators are separate parts from the body and move simultaneously in a track or slot when pulling or pushing either the left or right side. In another embodiment, the pressure applicators are attached to each half of the body, wherein the body parts are configured to move relative towards and away from each other, simultaneously or independently, thereby moving the applicators. In another embodiment, the pressure applicators may be attached using an attachment device or slide that travels outside and along an outer surface of the body, and move independently relative to each other.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A device comprising:

a body having a length extending in a longitudinal direction along a longitudinal axis and an overall height measured perpendicularly to the longitudinal direction and extending from a bottom surface to a top surface of the body, the length being longer than the overall height, the body configured to provide support to a user's neck and configured to be stabilized in the longitudinal direction relative to a support surface, the body comprising at least one longitudinally extending slot;

a stationary applicator holder contained within the body;

a first applicator and a second applicator each extending radially from the stationary applicator holder through the at least one longitudinally extending slot such that a tip of each of the first applicator and the second applicator extends at a height from the top surface of the body, wherein the length of the body is greater than the height of the first applicator and second applicator extending therefrom, the first and second applicators configured to apply pressure via at least two points on suboccipital muscles of the user, the first applicator and the second applicator being manually engageable and independently movable towards and away from each other relative to the longitudinal axis and at different positions along the stationary applicator holder to alter a spacing therebetween and thus alter positions of the at least two points at which to apply pressure to the suboccipital muscles;

wherein the body is configured for rotation about the longitudinal axis to adjust an angular position of the body and to thereby move the body and thus the first applicator and the second applicator therewith about the longitudinal axis, wherein longitudinal movement of each of the first applicator and the second applicator is (a) relative to the body, (b) independent from the rotation of the body, and (c) manually moved by the user by direct manual engagement thereof and without use of an intervening knob or a mechanical structure; and wherein each of the first applicator and the second applicator is selectively secured to the stationary applicator holder.

2. The device of claim 1, wherein each end of the tips of the first applicator and the second applicator is adjustable in a direction substantially perpendicular to the longitudinal direction of the body.

3. The device of claim 1, wherein the stationary applicator holder contained within the body is a rail, rod, track, or slide.

4. The device of claim 1, wherein the height of each of the first applicator and the second applicator is between 0.25 inches to 3.0 inches above the top surface of the body, and wherein the length of the body is between 4.0 inches to 14.0 inches.

5. The device of claim 1, wherein the tips of the first applicator and the second applicator have a texturized surface thereon.

6. The device of claim 1, wherein the tips are detachable and/or interchangeable.

7. The device of claim 5, wherein each of the tips are selected from a set of tips that have different dimensions and shapes.

8. The device of claim 1, further comprising a pad portion or a cushion portion provided on the body.

9. The device of claim 1, further comprising securement devices for the selective securement of each of the first applicator and the second applicator relative to the stationary applicator holder to secure said respective applicators along the longitudinal axis.

10. The device of claim 1, wherein the body is a substantially cylindrical body.

11. The device of claim 1, wherein said device further comprises a plurality of self-sustaining stabilizing surface portions for stabilizing the body relative to the support surface, the plurality of self-sustaining stabilizing surface portions configured for selective placement in one of a plurality of self-sustaining rotational positions of the body about the longitudinal axis and enabling the body, the first applicator, and the second applicator to be stabilized and maintained in each of the plurality of self-sustaining rotational positions relative to the support surface.

12. The device of claim 11, wherein the plurality of self-sustaining stabilizing surface portions are provided on the body itself.

13. The device of claim 11, wherein at least one of the plurality of self-sustaining stabilizing surface portions comprises a flat surface.

14. The device of claim 1, wherein the overall height of the body is greater than the height of the first applicator and second applicator.

15. The device of claim 1, wherein the at least one longitudinally extending slot comprises a slot length that is less than the length of the body.

16. The device of claim 15, wherein the slot length is 6 inches.

17. The device of claim 1, wherein the at least one longitudinally extending slot comprises two slots, each of the two slots having a longitudinal length that is less than the length of the body.

18. The device of claim 1, wherein the bottom surface of the body is configured to be positioned adjacent the support surface, and wherein the overall height of the body and the height of the first applicator and the second applicator extending radially from the stationary applicator holder are measured with the first applicator and the second applicator extending in a perpendicular direction relative to the support surface.

* * * * *